(12) United States Patent
Iacono et al.

(10) Patent No.: US 7,373,164 B2
(45) Date of Patent: *May 13, 2008

(54) APPARATUS AND METHODS FOR WIRELESS COMMUNICATION TRANSMISSION POWER CONTROL THAT SUPPORTS PHYSICAL CHANNEL RECONFIGURATION

(75) Inventors: Ana Lucia Iacono, Garden City, NY (US); John Mathisen McNally, Huntington, NY (US); Charles Dennean, Melville, NY (US); Janet Stern-Berkowitz, Little Neck, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 625 days.

This patent is subject to a terminal disclaimer.

(21) Appl. No.: 10/948,714

(22) Filed: Sep. 23, 2004

(65) Prior Publication Data

US 2005/0069044 A1    Mar. 31, 2005

Related U.S. Application Data

(60) Provisional application No. 60/506,522, filed on Sep. 26, 2003.

(51) Int. Cl.
*H04B 7/00* (2006.01)
*H04Q 7/20* (2006.01)

(52) U.S. Cl. .................. 455/522; 455/69; 455/571; 455/127.1; 370/311; 370/335; 370/342

(58) Field of Classification Search ................ 455/522, 455/69, 571, 127.1; 370/311, 335, 342
See application file for complete search history.

(56) References Cited

U.S. PATENT DOCUMENTS

| 6,285,887 | B1 * | 9/2001 | Mimura ....................... 455/522 |
| 6,418,134 | B1 * | 7/2002 | Geddes et al. .............. 370/342 |
| 6,434,135 | B1 * | 8/2002 | Ozluturk et al. ............ 370/342 |
| 6,674,740 | B1 * | 1/2004 | Siala .......................... 370/342 |
| 6,823,194 | B2 * | 11/2004 | Haim ......................... 455/522 |
| 6,868,075 | B1 | 3/2005 | Narvinger et al. |
| 6,882,857 | B2 * | 4/2005 | Zhang et al. ............... 455/522 |
| 2003/0112880 | A1 * | 6/2003 | Walton et al. .............. 375/260 |

FOREIGN PATENT DOCUMENTS

| RU | 2003124084 | 2/2005 |
| RU | 2003127751 | 3/2005 |
| RU | 2003130366 | 4/2005 |

(Continued)

OTHER PUBLICATIONS

3GPP TS 25.224, "Technical Specification Group Radio Network; Physical Layer Procedures (TDD)", V3.13.0, Sep. 2003.*

*Primary Examiner*—Edward F. Urban
*Assistant Examiner*—Ping Y Hsieh
(74) *Attorney, Agent, or Firm*—Volpe and Koenig, P.C.

(57) ABSTRACT

Apparatus and methods for wireless communication transmission power control are provided. Determination of gain factors and adjustments for physical channel reconfiguration in the context of transmission power control are addressed. Preferably, implementation is in conjunction with communication systems in which wireless communications are conducted between wireless transmit receive units (WTRUs) using multiple channels that are concurrently transmitted.

36 Claims, 11 Drawing Sheets

FOREIGN PATENT DOCUMENTS

| | | |
|---|---|---|
| RU | 2003131394 | 4/2005 |
| RU | 2004126843 | 7/2005 |
| WO | 02/063795 | 8/2002 |
| WO | 02/065667 | 8/2002 |
| WO | 02/075955 | 9/2002 |
| WO | 02/080401 | 10/2002 |
| WO | 03/067783 | 8/2003 |

* cited by examiner

| | Gain Factors for Physical Configuration 1, Reference TFC = TFC3 | | | | | |
|---|---|---|---|---|---|---|
| TFC | Max number of bits/radio frame before rate matching for DTCH ($N_1$) | Max number of bits/radio frame before rate matching for SRB (DCCH) ($N_2$) | Max number of bits/radio frame before rate matching ($N_1 + N_2$) | Physical configuration after partial DTX is applied | Max. Number of available data bits per radio frame | Percentage of bits repeated (+) or punctured (−) | Calculated gain factor (reference TFC = TFC3) |
| TFC1 | 534 | 0 | 534 | SF2 x 1 code x 1 timeslot | 2064 | +287% | 0.58 |
| TFC2 | 1062 | 0 | 1062 | SF2 x 1 code x 1 timeslot | 2064 | +94% | 0.82 |
| TFC3 | 1590 | 0 | 1590 | SF2 x 1 code x 1 timeslot | 2064 | +30% | 1.0 |
| TFC4 | 2118 | 0 | 2118 | SF2 x 1 code x 1 timeslot | 2064 | −3% | 1.15 |
| TFC5 | 4230 | 0 | 4230 | SF2 x 1 code x 1 timeslot + SF16 x 1 code x 1 time slot | 2340 | −45% | 1.54 |
| TFC6 | 534 | 129 | 663 | SF2 x 1 code x 1 timeslot | 2064 | +211% | 0.65 |
| TFC7 | 1062 | 129 | 1191 | SF2 x 1 code x 1 timeslot | 2064 | +73% | 0.87 |
| TFC8 | 1590 | 129 | 1719 | SF2 x 1 code x 1 timeslot | 2064 | +20% | 1.04 |
| TFC9 | 2118 | 129 | 2247 | SF2 x 1 code x 1 timeslot | 2064 | −8% | 1.19 |
| TFC10 | 4230 | 129 | 4359 | SF2 x 1 code x 1 timeslot + SF16 x 1 code x 1 time slot | 2340 | −46% | 1.56 |

Figure 4

| Gain Factors for Physical Configuration 2, Reference TFC = TFC3 | | | | | | |
|---|---|---|---|---|---|---|
| TFC | Max number of bits/radio frame before rate matching for DTCH (N₁) | Max number of bits/radio frame before rate matching for SRB (DCCH) (N₂) | Max number of bits/radio frame before rate matching (N₁+ N₂) | Physical configuration after partial DTX is applied | Max. Number of data bits per radio frame | Percentage of bits repeated (+) or punctured (-) | Calculated gain factor (reference TFC = TFC3) |
| TFC1 | 534 | 0 | 534 | SF4 x 1 code x 1 timeslot | 1032 | +93% | 0.58 |
| TFC2 | 1062 | 0 | 1062 | SF4 x 1 code x 1 timeslot | 1032 | -3% | 0.82 |
| TFC3 | 1590 | 0 | 1590 | SF4 x 1 code x 1 timeslot | 1032 | -35% | 1.0 |
| TFC4 | 2118 | 0 | 2118 | SF4 x 1 code x 2 timeslots | 2136 | +1% | 0.82 |
| TFC5 | 4230 | 0 | 4230 | SF4 x 1 code x 2 timeslots + SF16 x 1 code x 1 time slot | 2412 | -43% | 1.09 |
| TFC6 | 534 | 129 | 663 | SF4 x 1 code x 1 timeslot | 1032 | +56% | 0.65 |
| TFC7 | 1062 | 129 | 1191 | SF4 x 1 code x 1 timeslot | 1032 | -13% | 0.87 |
| TFC8 | 1590 | 129 | 1719 | SF4 x 1 code x 1 timeslot | 1032 | -40% | 1.04 |
| TFC9 | 2118 | 129 | 2247 | SF4 x 1 code x 2 timeslots | 2136 | -5% | 0.84 |
| TFC10 | 4230 | 129 | 4359 | SF4 x 1 code x 2 timeslots + SF16 x 1 code x 1 time slot | 2412 | -45% | 1.10 |

*Figure 5*

| | Gain factors for Physical Configuration 1, Reference TFC = TFC10 | | | | | | | |
|---|---|---|---|---|---|---|---|---|
| TFC | Max number of bits/radio frame before rate matching for DTCH ($N_1$) | Max number of bits/radio frame before rate matching for SRB (DCCH) ($N_2$) | Max number of bits/radio frame before rate matching ($N_1$+ $N_2$) | Physical configuration after partial DTX is applied | Max. Number of data bits per radio frame | Percentage of bits repeated (+) or punctured (-) | Gain factor (reference TFC = TFC4) | Gain factor (reference TFC = TFC 10) |
| TFC1 | 534 | 0 | 534 | SF2 x 1 code x 1 timeslot | 2064 | +287% | 0.50 | 0.37 |
| TFC2 | 1062 | 0 | 1062 | SF2 x 1 code x 1 timeslot | 2064 | +94% | 0.71 | 0.52 |
| TFC3 | 1590 | 0 | 1590 | SF2 x 1 code x 1 timeslot | 2064 | +30% | 0.87 | 0.64 |
| TFC4 | 2118 | 0 | 2118 | SF2 x 1 code x 1 timeslot | 2064 | -3% | 1.0 | 0.74 |
| TFC5 | 4230 | 0 | 4230 | SF2 x 1 code x 1 timeslot + SF16 x 1 code x 1 time slot | 2340 | -45% | 1.33 | 0.99 |
| TFC6 | 534 | 129 | 663 | SF2 x 1 code x 1 timeslot | 2064 | +211% | 0.56 | 0.41 |
| TFC7 | 1062 | 129 | 1191 | SF2 x 1 code x 1 timeslot | 2064 | +73% | 0.75 | 0.55 |
| TFC8 | 1590 | 129 | 1719 | SF2 x 1 code x 1 timeslot | 2064 | +20% | 0.90 | 0.67 |
| TFC9 | 2118 | 129 | 2247 | SF2 x 1 code x 1 timeslot | 2064 | -8% | 1.03 | 0.76 |
| TFC10 | 4230 | 129 | 4359 | SF2 x 1 code x 1 timeslot + SF16 x 1 code x 1 time slot | 2340 | -46% | 1.35 | 1.0 |

Figure 9

| | Gain Factors for Physical Configuration 2, Reference TFC = TFC10 | | | | | | |
|---|---|---|---|---|---|---|---|
| TFC | Max number of bits/radio frame before rate matching for DTCH ($N_1$) | Max number of bits/radio frame before rate matching for SRB (DCCH) ($N_2$) | Max number of bits/radio frame before rate matching ($N_1 + N_2$) | Physical configuration after partial DTX is applied | Max. Number of data bits per radio frame | Percentage of bits repeated (+) or punctured (-) | Gain factors (reference TFC = TFC4) | Gain factors (reference TFC = TFC 10) |
| TFC1 | 534 | 0 | 534 | SF4 x 1 code x 1 timeslot | 1032 | +93% | 0.71 | 0.53 |
| TFC2 | 1062 | 0 | 1062 | SF4 x 1 code x 1 timeslot | 1032 | -3% | 1.0 | 0.74 |
| TFC3 | 1590 | 0 | 1590 | SF4 x 1 code x 1 timeslot | 1032 | -35% | 1.23 | 0.91 |
| TFC4 | 2118 | 0 | 2118 | SF4 x 1 code x 2 timeslots | 2136 | +1% | 1.0 | 0.74 |
| TFC5 | 4230 | 0 | 4230 | SF4 x 2 timeslots + SF16 x 1 code x 1 time slot | 2412 | -43% | 1.33 | 0.99 |
| TFC6 | 534 | 129 | 663 | SF4 x 1 code x 1 timeslot | 1032 | +56% | 0.79 | 0.58 |
| TFC7 | 1062 | 129 | 1191 | SF4 x 1 code x 1 timeslot | 1032 | -13% | 1.06 | 0.78 |
| TFC8 | 1590 | 129 | 1719 | SF4 x 1 code x 1 timeslot | 1032 | -40% | 1.27 | 0.94 |
| TFC9 | 2118 | 129 | 2247 | SF4 x 1 code x 2 timeslots | 2136 | -5% | 1.03 | 0.76 |
| TFC10 | 4230 | 129 | 4359 | SF4 x 2 timeslots + SF16 x 1 code x 1 time slot | 2412 | -45% | 1.35 | 1.0 |

Figure 10

| | Gain Factors for Physical Configuration 2, Reference TFC = TFC6 | | | | | |
|---|---|---|---|---|---|---|
| TFC | Max number of bits/radio frame before rate matching for DTCH ($N_1$) | Max number of bits/radio frame before rate matching for SRB (DCCH) ($N_2$) | Max number of bits/radio frame before rate matching ($N_1 + N_2$) | Physical configuration after partial DTX is applied | Max. Number of data bits per radio frame | Percentage of bits repeated (+) or punctured (-) | Calculated gain factor (reference TFC = TFC6) |
| TFC1 | 534 | 0 | 534 | SF4 x 1 code x 1 timeslot | 1032 | +93% | 0.90 |
| TFC2 | 1062 | 0 | 1062 | SF4 x 1 code x 1 timeslot | 1032 | -3% | 1.27 |
| TFC3 | 1590 | 0 | 1590 | SF4 x 1 code x 1 timeslot | 1032 | -35% | 1.55 |
| TFC4 | 2118 | 0 | 2118 | SF4 x 1 code x 2 timeslots | 2136 | +1% | 1.26 |
| TFC5 | 4230 | 0 | 4230 | SF4 x 1 code x 2 timeslots + SF16 x 1 code x 1 time slot | 2412 | -43% | 1.68 |
| TFC6 | 534 | 129 | 663 | SF4 x 1 code x 1 timeslot | 1032 | +56% | 1.0 |
| TFC7 | 1062 | 129 | 1191 | SF4 x 1 code x 1 timeslot | 1032 | -13% | 1.34 |
| TFC8 | 1590 | 129 | 1719 | SF4 x 1 code x 1 timeslot | 1032 | -40% | 1.61 |
| TFC9 | 2118 | 129 | 2247 | SF4 x 1 code x 2 timeslots | 2136 | -5% | 1.30 |
| TFC10 | 4230 | 129 | 4359 | SF4 x 1 code x 2 timeslots + SF16 x 1 code x 1 time slot | 2412 | -45% | 1.71 |

Figure 12

| Gain Factors for Physical Configuration 2, Reference TFC = TFC3, Reference Gain Factor Recalculated | | | | | | | |
|---|---|---|---|---|---|---|---|
| TFC | Max number of bits/radio frame before rate matching for DTCH ($N_1$) | Max number of bits/radio frame before rate matching for SRB (DCCH) ($N_2$) | Max number of bits/radio frame before rate matching ($N_1 + N_2$) | Physical configuration after partial DTX is applied | Max. Number of data bits per radio frame | Percentage of bits repeated (+) or punctured (-) | Calculated gain factor (reference TFC = TFC3, $\beta_{ref,new}$ computed from $\beta_{ref,old}$) |
| TFC1 | 534 | 0 | 534 | SF4 x 1 code x 1 timeslot | 1032 | +93% | 0.82 |
| TFC2 | 1062 | 0 | 1062 | SF4 x 1 code x 1 timeslot | 1032 | -3% | 1.16 |
| TFC3 | 1590 | 0 | 1590 | SF4 x 1 code x 1 timeslot | 1032 | -35% | 1.41 |
| TFC4 | 2118 | 0 | 2118 | SF4 x 1 code x 2 timeslots | 2136 | +1% | 1.15 |
| TFC5 | 4230 | 0 | 4230 | SF4 x 1 code x 2 timeslots + SF16 x 1 code x 1 time slot | 2412 | -43% | 1.54 |
| TFC6 | 534 | 129 | 663 | SF4 x 1 code x 1 timeslot | 1032 | +56% | 0.91 |
| TFC7 | 1062 | 129 | 1191 | SF4 x 1 code x 1 timeslot | 1032 | -13% | 1.22 |
| TFC8 | 1590 | 129 | 1719 | SF4 x 1 code x 1 timeslot | 1032 | -40% | 1.47 |
| TFC9 | 2118 | 129 | 2247 | SF4 x 1 code x 2 timeslots | 2136 | -5% | 1.19 |
| TFC10 | 4230 | 129 | 4359 | SF4 x 1 code x 2 timeslots + SF16 x 1 code x 1 time slot | 2412 | -45% | 1.56 |

Figure 14

APPARATUS AND METHODS FOR WIRELESS COMMUNICATION TRANSMISSION POWER CONTROL THAT SUPPORTS PHYSICAL CHANNEL RECONFIGURATION

CROSS REFERENCE TO RELATED APPLICATION(S)

This application claims priority from U.S. Provisional Patent Application Ser. No. 60/506,522, filed Sep. 26, 2003, which is incorporated by reference as if fully set forth.

FIELD OF INVENTION

The present invention relates to apparatus and methods for wireless communication transmission power control, particularly for communication systems that implement wireless communications between wireless transmit receive units (WTRUs) using multiple channels that are concurrently transmitted. Determination of gain factors and adjustments for physical channel reconfiguration in the context of transmission power control are addressed.

BACKGROUND

Wireless communication systems are well known in the art. Generally, such systems comprise communication stations, i.e. wireless transmit/receive units (WTRUs), which transmit and receive wireless communication signals between each other. Depending upon the type of system, communication stations typically are one of two types: base stations or subscriber WTRUs, which include mobile units.

In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS (General Packet Radio Service) and EDGE (Enhanced Data rates for Global Evolution) are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services switching center also receives and administers connection requests from subscribers from external networks.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface. The Uu radio interface of a 3GPP communications system uses Transport Channels (TrCH) for transfer of user data and signaling between UEs and Node Bs. The channels are generally designated as Shared Channels, i.e. channels concurrently available to more than one UE, or dedicated channels (DCHs) which are assigned for use with a particular UE during a wireless communication.

In many wireless communication systems, adaptive transmission power control algorithms are used to control the transmission power of WTRUs. In such systems, many WTRUs may share the same radio frequency spectrum. When receiving a specific communication, all other communications transmitted on the same spectrum cause interference to the specific communication. As a result, increasing the transmission power level of one communication degrades the signal quality of all other communications within that spectrum. However, reducing the transmission power level too far results in undesirable received signal quality, such as measured by signal to interference ratios (SIRs) at the receivers.

Various methods of power control for wireless communication systems are well known in the art. An example of an open loop power control transmitter system for a wireless communication system is illustrated in FIG. 2. The purpose of such systems is to rapidly vary transmitter power in the presence of a fading propagation channel and time-varying interference to minimize transmitter power while insuring that data is received at the remote end with acceptable quality.

In communication systems such as Third Generation Partnership Project (3GPP) Time Division Duplex (TDD) and Frequency Division Duplex (FDD) systems, multiple shared and dedicated channels of variable rate data are combined for transmission. In 3GPP wideband CDMA (WCDMA) systems, power control is used as a link adaptation method. Dynamic power control is applied for dedicated physical channels (DPCH), such that the transmit power of the DPCHs is adjusted to achieve a quality of service (QoS) with a minimum transmit power level, thus limiting the interference level within the system.

One conventional approach for power control is to divide transmission power control into separate processes, referred to as outer loop power control (OLPC) and inner loop power control (ILPC). The power control system is generally referred to as either open or closed dependent upon whether the inner loop is open or closed. Typically for 3GPP systems for uplink communications, the outer loops of both types of systems are closed loops. The inner loop in an example WCDMA open loop type of system illustrated in FIG. 2 is an open loop.

In outer loop power control, the power level of a specific transmitter is typically based on a target, such as a target SIR value. As a receiver receives the transmissions, the quality of the received signal is measured. In 3GPP systems, the transmitted information is sent in units of transport blocks (TBs) and the received signal quality can be monitored on a block error rate (BLER) basis. The BLER is estimated by the receiver, typically by a cyclic redundancy check (CRC) of the data. This estimated BLER is compared to a target quality requirement, such a target BLER, representative of QoS requirements for the various types of data services on the channel. Based on the measured received signal quality, a target SIR adjustment control signal is generated and the target SIR is adjusted in response to these adjustment control signals.

In inner loop power control, the receiver compares a measurement of the received signal quality, such as SIR, to a threshold value. If the SIR exceeds the threshold, a transmit power command (TPC) to decrease the power level is sent. If the SIR is below the threshold, a TPC to increase the power level is sent. Typically, the TPC is multiplexed with data in a dedicated channel to the transmitter. In response to received TPC, the transmitter changes its transmission power level.

Conventionally, the outer loop power control algorithm in a 3GPP system sets an initial target SIR for each coded composite transport channel (CCTrCH) based on a required target BLER, using a fixed mapping between BLER and SIR, assuming a particular channel condition. A CCTrCH is commonly employed for transmitting various services on a physical wireless channel by multiplexing several transport channels (TrCHs), each service on its own TrCH. In order to monitor the BLER level on a CCTrCH basis, a reference transport channel (RTrCH) may be selected among the transport channels multiplexed on the considered CCTrCH.

Uplink power control for dedicated channels transmitted by WTRUs in a 3GPP system typically consists of a closed outer loop and an open inner loop such as is the example illustrated in FIG. 2. The closed outer loop is responsible for determination of a SIR target for the uplink transmission made by a particular WTRU. The initial value of SIR target is determined by a Controlling RNC (C-RNC), and then can be adjusted by a Serving RNC (S-RNC) based on measurement of uplink CCTrCH quality. The S-RNC then sends the update of the SIR target to the WTRU. The open inner loop calculates the uplink transmit power by the WTRU measuring the serving cell's P-CCPCH received signal code power (RSCP) every frame and calculating pathloss between the Node B and the WTRU. Based on the pathloss and the UTRAN signaled values of SIR target and UL Timeslot interference signal code power (ISCP) of the UL CCTrCH, the WTRU calculates the transmit power of a dedicated physical channel ($P_{DPCH}$).

Each DPCH (DPCHi) of the CCTrCH is then separately weighted by a weight factor γi which compensates for the different spreading factors used by the different DPCHs. The DPCHs in each timeslot are then combined using complex addition.

After combination of physical channels, the CCTrCH gain factor β is applied. The gain factor compensates for differences in transmit power requirements for different TFCs assigned to the CCTrCH: each TFC represents a different combination of data from each of the transport channels of the Coded Composite Transport Channel (CCTrCH). Each combination can result in a different amount of repetition or puncturing applied to each TrCH in the CCTrCH. Since puncturing/repetition affects the transmit power required to obtain a particular signal to noise ratio (Eb/N0), the gain factor applied depends on the TFC being used, i.e. each TFC of the CCTrCH has its own gain factor. The value for gain factor βj applies to the jth TFC of the CCTrCH. This process is illustrated conceptually in FIG. 3 where, for example, the dedicated channels DPCH1 and DPCH2 carry data of the jth TFC of TrCHs.

The βj value can be explicitly signaled to the WTRU for each TFCj, or the radio resource control (RRC) in the RNC can indicate that the UE should calculate βj for each TFC based on an explicitly signaled value of a reference TFC. This calculation is conventionally done based on the rate matching parameters and the number of resource units needed by the given TFCj and the reference TFC, where a resource unit is defined, for example, as one SF16 code. For physical channel configurations with SF 16 codes only, the number of resource units (RUs) is equal to the number of codes. For configurations with codes that are not all SF 16, the number of RUs is the equivalent number of SF 16 codes.

Equivalency for each of the spreading factors is as follows: 1 SF8 code=2 RUs, 1 SF4 code=4 RUs, 1 SF2 code=8 RUs, 1 SF 1 code=16 RUs.

The first method is referred to as "signaled gain factors" and the second as "computed gain factors".

The conventional method for a subscriber WTRU to calculate β factors based on a reference TFC is provided is as follows:

Let βref denote the signaled gain factor for the reference TFC and βj denote the gain factor used for the j-th TFC.

Define the variable:

$$K_{ref} = \sum_i RM_i \times N_i$$

where RMi is the semi-static rate matching attribute for transport channel i, Ni is the number of bits output from the radio frame segmentation block for transport channel i and the sum is taken over all the transport channels i in the reference TFC.

Similarly, define the variable $$K_j = \sum_i RM_i \times N_i$$

where the sum is taken over all the transport channels i in the j-th TFC.

Moreover, define the variable $$L_{ref} = \sum_i \frac{1}{SF_i}$$

where SFi is the spreading factor of DPCH i and the sum is taken over all DPCH i used in the reference TFC.

Similarly, define the variable $$L_j = \sum_i \frac{1}{SF_i}$$

where the sum is taken over all DPCH i used in the j-th TFC.

The gain factor βj for the j-th TFC is then conventionally computed as:

$$\beta_j = \sqrt{\frac{L_{ref}}{L_j}} \times \sqrt{\frac{K_j}{K_{ref}}}$$

Instead of sending a reference TFC, the values of the gain factor for each TFC can be determined in the RNC and sent to the WTRU. However, the current standards do not define how to determine the signaled gain factor values that are to be sent to the WTRUs. The inventors have recognized that the calculation of gain factors for TFCs can be improved by making them proportional to the gain factor applicable to a reference TFC. This improvement has applicability for both "signaled gain factors" and "computed gain factors".

Another problem arising in conventional system relates to uplink power control maintenance during reconfiguration. When physical channel reconfiguration changes the spreading factors used for a CCTrCH, puncturing/repetition for each TFC may be different before and after the reconfiguration. Since conventionally the gain factors depend on the relative puncturing/repetition among the TFCs, the gain factors used before reconfiguration may be misaligned with the puncturing/repetition after reconfiguration.

The inventors have recognized that this leads to the need for power control to re-converge based on the new puncturing/repetition of the TFCs. If new gain factors are computed or selected which do not result in the same output power levels after reconfiguration relative to puncturing/repetition, re-convergence is required. To reduce the need for re-convergence, the inventors have recognized that it would be advantageous to:

- select a reference TFC and a reference gain factor value which will be appropriate before and after reconfiguration;
- select a new reference TFC to use after reconfiguration (reference gain factor remains the same before and after reconfiguration);
- select a new reference gain factor to use after reconfiguration (reference TFC remains the same before and after reconfiguration); and/or
- select a new SIR target to use after reconfiguration.

SUMMARY

Apparatus and methods for determination of gain factors for wireless communication transmission power control are provided. Preferably, implementation is in conjunction with communication systems in which wireless communications are conducted between wireless transmit receive units (WTRUs) using multiple channels that are concurrently transmitted.

In one aspect of the invention, a method of transmission power control for a WTRU that transmits signals in a forward composite channel carrying data in a selected combination of channels is provided where the WTRU is configured to make forward channel power adjustments as a function of target metrics computed based on the data signals as received over the forward channel. A reference gain factor βref is determined for a reference combination of channels. A combination of channels is selected for data transmission on the forward composite channel. When the selected combination of channels is not the same as the reference combination of channels, a gain factor β for the selected combination of channels is computed such that the gain factor β for the selected combination of channels is proportional to the reference gain factor βref. The gain factor β for the selected combination of channels is then applied in making forward channel power adjustments to the forward composite channel when transmitting data signals on the forward composite channel using the selected combination of channels.

Preferably, the WTRU is configured for use in a code division multiple access (CDMA) system, the data channels are transport channels (TrCHs), the composite channel is an uplink coded composite transport channel (CCTrCH) and a transport format combination (TFC) is associated with each of a set of predefined format channel combinations of the CCTrCH where one of the format channel combinations is the reference combination of channel, TFCref. In such case, a jth combination of channels TFCj is selected for data transmission on the forward composite channel and a gain factor β is computed for the selected combination of channels such that: $\beta_j = X \times \beta_{ref}$. The gain factor βj can be computed by the WTRU or outside of the WTRU in which case it is signaled to the WTRU. In the latter case, the gain factor is preferably quantized before being signaled to the WTRU.

For implementation, a WTRU is provided that has a transmitter, receiver and an associated processor. The transmitter is preferably configured to transmit signals in a forward composite channel carrying communication data in a selected combination of channels. The receiver is preferably configured to receive target metric data computed based on the communication data signals as received over the forward channel. The processor associated is operatively with the transmitter and is preferably configured to make forward channel power adjustments as a function of received target metric data. The processor is preferably configured to apply a gain factor for transmitter power control for a combination of channels that is selected for data transmission on the forward composite channel such that when the selected combination of channels is not the same as a reference combination of channels, the gain factor is computed for the selected combination of channels such that the gain factor for the selected combination of channels is proportional to a reference gain factor determined for the reference combination of channels.

Preferably, the WTRU is configured for use in a code division multiple access (CDMA) system wherein the data channels are transport channels (TrCHs), the composite channel is an uplink coded composite transport channel (CCTrCH) and a transport format combination (TFC) is associated with each of a set of predefined format channel combinations of the CCTrCH where one of the format channel combinations is the reference combination of channel, TFCref, having a reference gain factor βref and a jth combination of channels TFCj is the selected channel combination for data transmission on the forward composite channel. In such case, the processor is preferably configured to apply and compute a gain factor βj for the selected combination of channels TFCj such that $\beta_j = X \times \beta_{ref}$.

The invention includes the provision of a WTRU configured to assist in transmission power control for a transmitting unit that transmits signals in a forward composite channel carrying communication data in a selected combination of channels where the transmitting unit is configured to make forward channel power adjustments as a function gain factors determined by the WTRU. Such a WTRU preferably has a receiver configured to receive communication signals transmitted by the transmitting unit in a selected combination of channels on the forward composite channel along with a processor and a transmitter. The processor is preferably configured to computed a gain factor β for the selected combination of channels received on the forward composite channel such that the gain factor β is determined to be a reference gain factor βref where the selected combination of channels is a reference combination of channels or is otherwise computed to be proportional to the reference gain factor βref. The transmitter is preferably configured to transmit data reflective of the gain factor β to the transmitting unit to enable the transmitting unit to make forward channel power adjustments based thereon. Where the transmitting unit is configured to make forward channel power adjustments as a function of target metrics computed by the WTRU, the WTRU preferably has a processor configured to computed target metrics based on the data signals as received over the forward channel that is operatively associated with the WTRU's transmitter such that computed target metric data is transmitted to the transmitting unit to enable the transmitting unit to make forward channel power adjustments based thereon.

Such a WTRU is preferably configured as a network station for use in a code division multiple access (CDMA) system where the data channels are transport channels (TrCHs), the composite channel is an uplink coded composite transport channel (CCTrCH) and a transport format combination (TFC) is associated with each of a set of predefined format channel combinations of the CCTrCH where one of the format channel combinations is the reference combination of channel, TFCref. In such case, the network station's processor is preferably configured to compute a gain factor for the selected combination of channels such that when a jth combination of channels TFCj is the selected channel combination used by the transmitting unit for data transmission on the forward composite channel, where TFCj is not TFCref, a gain factor βj is computed for the selected combination of channels such that: $\beta_j = X \times \beta_{ref}$. Preferably, the processor is configured to quantize the gain factor βj and the transmitter is configured to transmit the quantized gain factor βj to the transmitting unit.

Another aspect of the invention provides, a method of transmission power control for a WTRU that transmits communication signals in a forward composite channel carrying data in a selected combination of channels with respect to a selected physical transmission configuration of the forward composite channel. Communication signals are transmitted in the forward composite channel in a selected combination of channels with respect to a first physical transmission configuration of the forward composite channel. A reference combination of channels is determined with respect to the first physical transmission configuration of the forward composite channel. A gain factor β is applied to the transmission of communication signals in the selected combination of channels with respect to the first physical transmission configuration of the forward composite channel where the gain factor β is determined based on spreading factors of the selected combination of channels and the reference combination of channels with respect to the first physical transmission configuration of the forward composite channel. The transmission of communication signals in the forward composite channel is reconfigured to transmit the signals in a selected combination of channels with respect to a second physical transmission configuration of the forward composite channel. A reference combination of channels is determined with respect to the second physical transmission configuration of the forward composite channel. A gain factor β' is applied to the transmission of communication signals in the selected combination of channels with respect to the second physical transmission configuration of the forward composite channel where the gain factor β' is determined based on spreading factors of the selected combination of channels and the reference combination of channels with respect to the second physical transmission configuration of the forward composite channel.

Where the WTRU is configured for use in a code division multiple access (CDMA) system, the data channels are transport channels (TrCHs) that may have different spreading factors for different physical configurations of the composite channel, the composite channel is an uplink coded composite transport channel (CCTrCH) and a transport format combination (TFC) is associated with each of a set of predefined format channel combinations of the CCTrCH defined for all physical configurations, the reference combination of channels with respect to the first physical transmission configuration of the forward composite channel is preferably determined to be one of set of predefined format channel combinations, TFCref1, that has an associated gain factor βref1. The reference combination of channels with respect to the second physical transmission configuration of the forward composite channel is preferably determined to be one of set of predefined format channel combinations, TFCref2, that has an associated gain factor βref2.

Where a common TFC that yields similar puncturing/repetition for the first and second physical channel configurations is identified, the common TFC is preferably determined to be the reference channel combination TFCref1 and also the reference channel combination TFCref2 and the gain factor βref2 is selected to equal the gain factor βref1. As one alternative, reference channel combination TFCref2 can be determined by identifying a TFC that has similar puncturing/repetition for the second physical channel configuration as compared with puncturing/repetition of reference channel combination TFCref1 with respect to the first physical channel configuration and the gain factor βref2 is then selected to equal the gain factor βref1. As another alternative, the reference channel combination TFCref2 can be selected to be the same TFC as reference channel combination TFCref1 and the gain factor βref2 is then selected based on the gain factor βref1 and spreading factor changes in the reference channel combination from the first physical configuration to the second physical configuration of the forward composite channel.

Preferably, a jth combination of channels TFCj is selected for data transmission with respect to the first physical transmission configuration on the forward composite channel and a gain factor β is applied that is computed for the selected combination of channels such that: $\beta_j = X \ast \beta_{ref1}$ where X is based upon spreading factors of TFCj and TFCref1 with respect to the first physical transmission configuration of the forward composite channel. Also, a kth combination of channels TFCk is preferably selected for data transmission with respect to the second physical transmission configuration on the forward composite channel and a gain factor βk is applied that is computed for the selected combination of channels such that: $\beta_k = X' \ast \beta_{ref2}$ where X' is based upon spreading factors of TFCk and TFCref2 with respect to the second physical transmission configuration of the forward composite channel.

For implementation, a WTRU is provided that has a transmitter, receiver and an associated processor. The transmitter is configured to transmit communication signals in a forward composite channel carrying data in a selected combination of channels with respect to a selected physical transmission configuration of the forward composite channel. The processor is preferably configured to make forward channel power adjustments as a function of target metrics computed based on the data signals as received over the forward channel in conjunction with applying a gain factor based on a reference combination of channels with respect to the selected physical transmission configuration of the forward composite channel. The transmitter is preferably further configured to reconfigure the transmission of communication signals in the forward composite channel from transmission in a first selected combination of channels with respect to a first physical transmission configuration of the forward composite channel to transmission in a second selected combination of channels with respect to a second physical transmission configuration of the forward composite channel. The processor is preferably further configured to compute and apply a gain factor to the transmission of communication signals in a selected combination of channels with respect to the respective physical transmission configuration of the forward composite channel such that the gain factor is determined based on spreading factors of the selected combination and a reference combination of channels with respect to the respective physical transmission configuration of the forward composite channel.

Preferably, such a WTRU is configured for use in a code division multiple access (CDMA) system where the data channels are transport channels (TrCHs) that may have different spreading factors for different physical configurations of the composite channel, the composite channel is an uplink coded composite transport channel (CCTrCH) and a transport format combination (TFC) is associated with each of a set of predefined format channel combinations of the CCTrCH defined for all physical configurations. In such case the processor is preferably configured to select a reference combination of channels, TFCref1, with respect to the first physical transmission configuration of the forward composite channel from the set of predefined format channel combinations, that has an associated gain factor βref1 and a reference combination of channels, TFCref2, with respect to the second physical transmission configuration of the forward composite channel from the set of predefined format channel combinations that has an associated gain factor βref2.

The processor can be configured to identify a common TFC that yields similar puncturing/repetition for the first and second physical channel configurations and to select the common TFC as the reference channel combination TFCref1 and also the reference channel combination TFCref2 and to select the gain factor βref2 to equal the gain factor βref1. The processor can be configured to select the reference channel combination TFCref2 by identifying a TFC that has similar puncturing/repetition for the second physical channel configuration as compared with puncturing/repetition of reference channel combination TFCref1 with respect to the first physical channel configuration and to select the gain factor βref2 to equal the gain factor βref1. The processor can be configured to select the reference channel combination TFCref2 to be the same TFC as the reference channel combination TFCref1 and to compute the gain factor βref2 based on the gain factor βref1 and spreading factor changes in the reference channel combination from the first physical configuration to the second physical configuration of the forward composite channel. Where one of the format channel combinations is a selected reference combination of channel, TFCref, and a jth combination of channels TFCj is the selected channel combination for data transmission on the forward composite channel, the processor is preferably configured to apply and compute a gain factor βj for the selected combination of channels TFCj such that: $\beta_j = X \times \beta_{ref}$.

An alternative method is provided for a WTRU that transmits communication signals in a forward composite channel carrying data in a selected combination of channels with respect to a selected physical transmission configuration of the forward composite channel where the WTRU is configured to make forward channel power adjustments as a function of target metrics computed based on the data signals as received over the forward channel in conjunction with applying a gain factor based on a reference combination of channels with respect to the selected physical transmission configuration of the forward composite channel. A reference combination of channels is determined with respect to the forward composite channel. Communication signals are transmitted in the forward composite channel in a selected combination of channels with respect to a first physical transmission configuration of the forward composite channel. The reference combination of channels of the forward composite channel is used for determining a gain factor to apply to the transmission of communication signals in the selected combination of channels with respect to the first physical transmission configuration of the forward composite channel. Forward channel power adjustments are made as a function of target metrics computed based on the data signals as received over the forward channel with respect to the first physical transmission configuration of the forward composite channel. The transmission of communication signals in the forward composite channel are reconfigured to transmit the signals in a selected combination of channels with respect to a second physical transmission configuration of the forward composite channel in conjunction with adjusting the forward channel transmission power based on an updated target metric computed as a function of spreading factor changes in the reference channel combination from the first physical configuration to the second physical configuration of the forward composite channel. The reference combination of channels with respect to the second physical transmission configuration of the forward composite channel is used for determining a gain factor to apply to the transmission of communication signals in the selected combination of channels with respect to the second physical transmission configuration of the forward composite channel.

Where the WTRU is configured for use in a code division multiple access (CDMA) system, the data channels are transport channels (TrCHs) that may have different spreading factors for different physical configurations of the composite channel, the composite channel is an uplink coded composite transport channel (CCTrCH), a transport format combination (TFC) is associated with each of a set of predefined format channel combinations of the CCTrCH defined for all physical configurations and Signal to Interference Ratio (SIR) metrics of the transmitted communication signals as received are used to compute a target SIR upon which forward channel power adjustments are based, the reference combination of channels of the forward composite channel is preferably determined to be one of the set of predefined format channel combinations, TFCref, that has an associated gain factor βref and the updated target metric used in adjusting the forward channel transmission power in conjunction with reconfiguration is an updated target SIR. The updated target SIR, SIR_targetnew, is preferably computed such that $$\text{SIR\_target}_{new} = \text{SIR\_target}_{old} + 10\log\left(\frac{L_{ref2}}{L_{ref1}}\right)$$

where

SIR_target$_{old}$ is the most recently used target metric for making forward channel power adjustments with respect to the first physical transmission configuration of the forward composite channel;

$$L_{ref1} = \sum_i \frac{1}{SF_i}$$

where SFi is a spreading factor of a dedicated physical channel (DPCH) i with respect to the first physical configuration and the sum is taken over all DPCH i used in TFCref; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref.

For implementation of such alternate method, a WTRU is provided that has a transmitter, receiver and an associated processor. The transmitter is configured to transmit communication signals in a forward composite channel carrying data in a selected combination of channels with respect to a selected physical transmission configuration of the forward composite channel. The processor is preferably configured to make forward channel power adjustments as a function of target metrics computed based on the communication signals as received over the forward channel in conjunction with applying a gain factor based on a reference combination of channels with respect to the selected physical transmission configuration of the forward composite channel. The transmitter is preferably further configured to reconfigure the transmission of communication signals in the forward composite channel from transmission in a first selected combination of channels with respect to a first physical transmission configuration of the forward composite channel to transmission in a second selected combination of channels with respect to a second physical transmission configuration of the forward composite channel in conjunction with the processor adjusting the forward channel transmission power based on an updated target metric computed as a function of spreading factor changes in the reference channel combination from the first physical configuration to the second physical configuration of the forward composite channel. The processor can be further configured to use the reference combination of channels of the forward composite channel for determining a gain factor β to apply to the transmission of communication signals in selected combination of channels of the forward composite channel.

Preferably, such a WTRU is configured for use in a code division multiple access (CDMA) system where the data channels are transport channels (TrCHs) that may have different spreading factors for different physical configurations of the composite channel, the composite channel is an uplink coded composite transport channel (CCTrCH), a transport format combination (TFC) is associated with each of a set of predefined format channel combinations of the CCTrCH defined for all physical configurations, the reference combination of channels of the forward composite channel, TFCref, is one of the set of predefined format channel combinations and has an associated gain factor βref and where Signal to Interference Ratio (SIR) metrics of the transmitted communication signals as received are used to compute a target SIR upon which forward channel power adjustments are based. The processor is then preferably configured to use an updated target SIR as the updated target metric used in adjusting the forward channel transmission power in conjunction with transmission reconfiguration. The processor can be configured such that, when a jth combination of channels TFCj is selected for data transmission with respect to a current physical transmission configuration on the forward composite channel, a gain factor βj is computed and applied for the selected combination of channels such that: βj=X*βref where X is based upon spreading factors of TFCj and TFCref with respect to the current physical transmission configuration of the forward composite channel.

Other objects and advantages of the present invention will be apparent to persons skilled in the art from the following description and accompanying drawings.

BRIEF DESCRIPTION OF THE DRAWING(S)

FIG. 4 is a table of Gain Factors for a first example for a first configuration, Physical Configuration 1.

FIG. 5 is a table of Gain Factors for the first example for a second configuration, Physical Configuration 2.

FIG. 9 is a table of Gain Factors for the second and third examples for Physical Configuration 1.

FIG. 10 is a table of Gain Factors for the second and third examples for Physical Configuration 2.

FIG. 12 is a table of Gain Factors for the fourth example for Physical Configuration 2.

FIG. 14 is a table of Gain Factors for the fifth example for Physical Configuration 2.

DETAILED DESCRIPTION OF THE PREFERRED EMBODIMENT(S)

Figure 1:
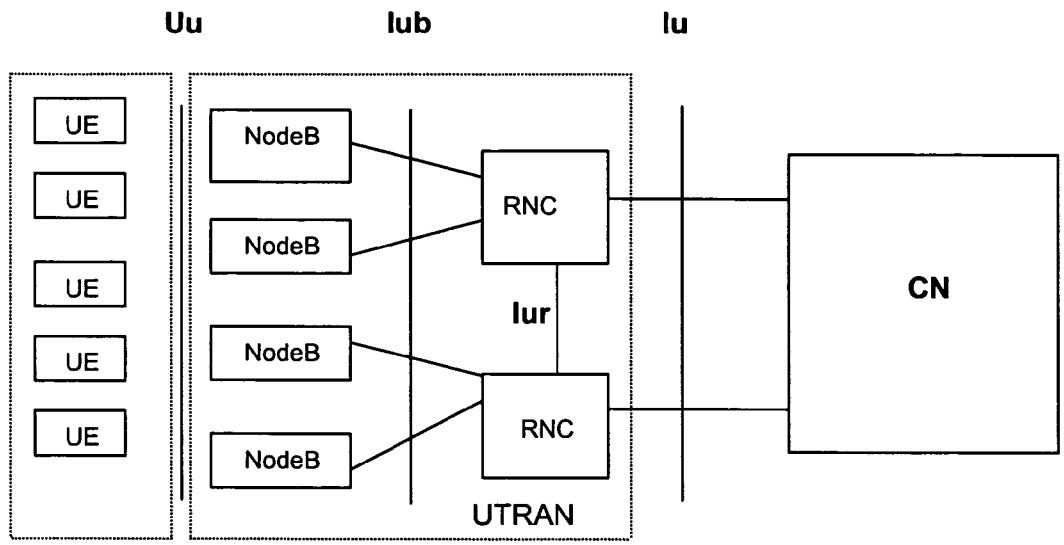
FIG. 1 is a schematic diagram of a typical CDMA system in accordance with current 3GPP specifications.

Although the features and elements of the present invention are described in the preferred embodiments in particular combinations, each feature or element can be used alone (without the other features and elements of the preferred embodiments) or in various combinations with or without other features and elements of the present invention.

The present invention is described with reference to the drawing figures wherein like numerals represent like elements throughout. The terms base station, wireless transmit/receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units. Generically, base stations are also WTRUs.

Although the preferred embodiments are described in conjunction with a third generation partnership program (3GPP) code division multiple access (CDMA) system utilizing the time division duplex (TDD) mode, the embodiments are applicable to any wireless communication system that utilizes multiple concurrent channels with dynamically controlled transmission power. Additionally, the embodiments are applicable to CDMA systems, in general, such as frequency division duplex (FDD) mode of a 3GPP CDMA system.

Conventional power control methods for wireless systems such as 3GPP utilize so-called inner and outer loops. The power control system is referred to as either open or closed dependent upon whether the inner loop is open or closed.

Figure 2:
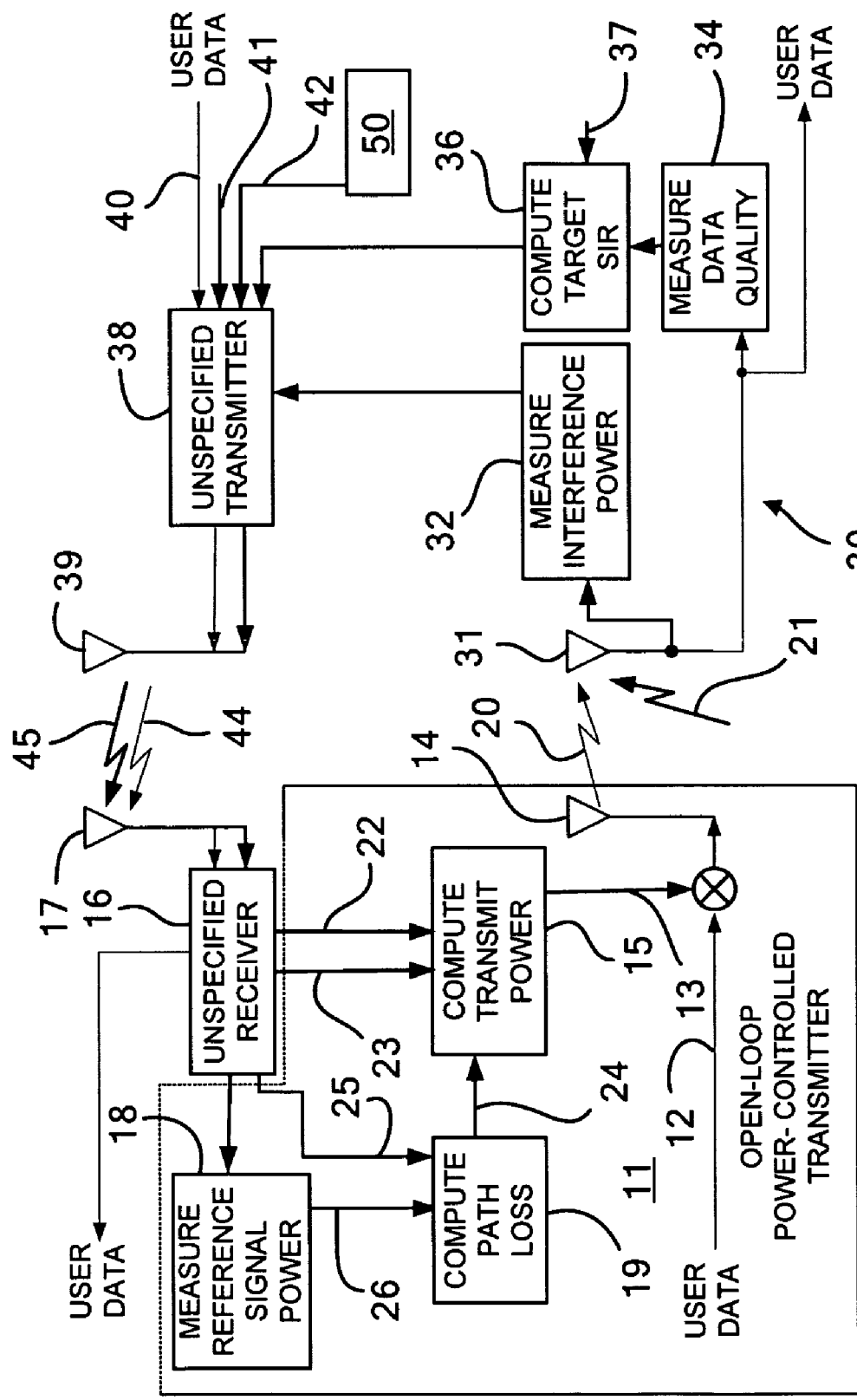
FIG. 2 is a schematic diagram of an open loop power control system for a wireless communication system which implements outer loop power control via a target SIR metric that can be configured in accordance with the teachings of the present invention.

Pertinent portions of an open loop power control system having a "transmitting" communication station 10 and a "receiving" communication station 30 are shown in FIG. 2. Both stations 10, 30 are transceivers. Typically one is a base station, called a Node B in 3GPP, and the other a type of WTRU, called a user equipment UE in 3GPP. For clarity, only selected components are illustrated and the invention is described in terms of a preferred 3GPP system, but the invention has application to wireless communication systems in general, even such systems that perform ad hoc networking where WTRUs communicate between themselves. Power control is important to maintain quality signaling for multiple users without causing excessive interference.

The transmitting station 10 includes a transmitter 11 having a data line 12 which transports a user data signal for transmission. The user data signal is provided with a desired power level which is adjusted by applying a transmit power adjustment from an output 13 of a processor 15 to adjust the transmission power level. The user data is transmitted from an antenna system 14 of the transmitter 11.

A wireless radio signal 20 containing the transmitted data is received by the receiving station 30 via a receiving antenna system 31. The receiving antenna system will also receive interfering radio signals 21 which impact on the quality of the received data. The receiving station 30 includes an interference power measuring device 32 to which the received signal is input which device 32 outputs measured interference power data. The receiving station 30 also includes a data quality measuring device 34 into which the received signal is also input which device 34 produces a data quality signal. The data quality measuring device 34 is coupled with a processing device 36 which receives the signal quality data and computes target signal to interference ratio (SIR) data based upon a user defined quality standard parameter received through an input 37.

The receiving station 30 also includes a transmitter 38 which is coupled with the interference power measuring device 32 and the target SIR generating processor 36. The receiving station's transmitter 38 also includes inputs 40, 41, 42 for user data, a reference signal, and reference signal transmit power data, respectively. The receiving station 30 transmits its user data and the control related data and references signal via an associated antenna system 39.

The transmitting station 10 includes a receiver 16 and an associated receiving antenna system 17. The transmitting station's receiver 16 receives the radio signal transmitted from the receiving station 30 which includes the receiving station's user data 44 and the control signal and data 45 generated by the receiving station 30.

The transmitting station's transmitter's processor 15 is associated with the transmitting station's receiver 16 in order to compute a transmit power adjustment. The transmitter 11 also includes a device 18 for measuring received reference signal power which device 18 is associated with path loss computing circuitry 19.

In order to compute the transmit power adjustment, the processor 15 receives data from a target SIR data input 22 which carries the target SIR data generated by the receiver station's target SIR generating processor 36, an interference power data input 23 which carries the interference data generated by the receiving station's interference power measuring device 32, and a path loss data input 24 which carries a path loss signal that is the output of the path loss computing circuitry 19. The path loss signal is generated by the path loss computing circuitry 19 from data received via a reference signal transmit power data input 25 which carries the reference signal transmit power data originating from the receiving station 30 and a measured reference signal power input 26 which carries the output of the reference signal power measuring device 18 of the transmitter 11. The reference signal measuring device 18 is coupled with the transmitting station's receiver 16 to measure the power of the reference signal as received from the receiving station's transmitter 38. The path loss computing circuitry 19 preferably determines the path loss based upon the difference between the known reference power signal strength conveyed by input 25 and the measured received power strength conveyed by input 26.

Interference power data, reference signal power data and target SIR values are signaled to the transmitting station 10 at a rate significantly lower than the time-varying rate of the propagation channel and interference. The "inner" loop is the portion of the system which relies on the measured interface. The system is considered "open loop" because there is no feedback to the algorithm at a rate comparable to the time-varying rate of the propagation channel and interference indicating how good the estimates of minimum required transmitter power are. If required transmit power level changes rapidly, the system cannot respond accordingly to change the power adjustment in a timely manner.

With respect to the outer loop of the open loop power control system of FIG. 2, at the remote receiver station 30, the quality of the received data is evaluated via the measuring device 34. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) in processor 36 and an updated target SIR is then output. The updated target SIR is that value (in theory) which applied in the transmitter inner loop would cause the measured metric to converge to the desired value. Finally, the updated target SIR is passed, via the receiving station transmitter 38 and the transmitting station receiver 16, to the transmitter 11 for use in its inner loop. The update rate of target SIR is bounded by the time required to accumulate the quality statistic and practical limits on the signaling rate to the power-controlled transmitter.

In the context of a composite data channel that carries data from various permissible combinations of data channels, such as a 3GPP CCTrCH, the processor 15 of the transmitting WTRU 10 is preferably configured to compute transmit power by applying a gain factor $\beta$ that corresponds to the specific combination of data channels for which data is then being transmitted via the composite channel. In accordance with the teachings of the present invention, the gain factor for each combination of data channels is calculated to be proportional to the gain factor $\beta$ref of a reference data channel combination, i.e. for a jth combination of data channels the corresponding gain factor $\beta j = X * \beta$ref, where X is another value that may be calculated based on other variables.

The gain factor value may either be computed in the transmitting WTRU or in the receiving WTRU 30. In the latter case the gain factor is then sent to the transmitting WTRU 10 such as via input 42 of the receiving WTRU's transmitter 38 associated with a processing device 50 that calculates the gain factor.

Figure 3:
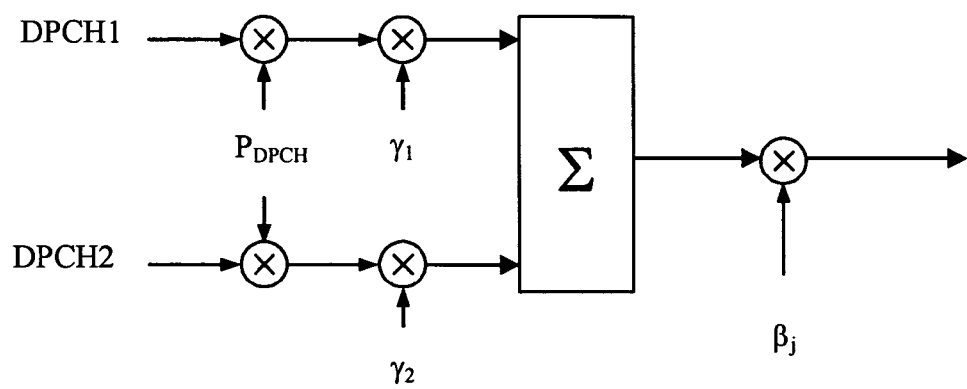
FIG. 3 is a schematic illustration of a conventional combination of physical channels carrying data for the TrCHs of a jth TFC to which a CCTrCH gain factor is applied.

For example, for a 3GPP uplink CCTrCH, where the transmitting WTRU 10 is a UE that is communicating with a UTRAN as the receiving WTRU, the processor 15 is preferably be configured to calculates the transmit power of the dedicated physical channel ($P_{DPCH}$) associated with the CCTrCH based on pathloss and the UTRAN signaled values of SIR target and UL Timeslot interference signal code power (ISCP) of the UL CCTrCH in a conventional manner. Each DPCH of the CCTrCH is also then preferably separately weighted by a conventional weight factor $\gamma i$ which compensates for the different spreading factors used by the different DPCHs and, in each timeslot, then combined using complex addition as illustrated in FIG. 3.

After combination of physical channels, the processor 15 then preferably applies a CCTrCH gain factor calculated in accordance with the teachings of the present invention. Accordingly, where the CCTrCH has a reference TFC, TFCref, but is using a jth TFC, TFCj, a gain factor $\beta j$ is applied that is proportional to a gain factor $\beta$ref for the reference TCF, TFCref., i.e. $\beta_j = X \times \beta_{ref}$.

The gain factor is also preferably based on rate matching parameters and the number of resource units needed by the given TFCj and the reference TFC, where a resource unit is defined, for example, as one SF16 code. Accordingly, X is preferably selected in accordance with the conventional parameters as follows:

Define the variable:

$$K_{ref} = \sum_i RM_i \times N_i$$

where $RM_i$ is the semi-static rate matching attribute for transport channel i, $N_i$ is the number of bits output from the radio frame segmentation block for transport channel i and the sum is taken over all the transport channels i in the reference TFC.

Similarly, define the variable $$K_j = \sum_i RM_i \times N_i$$

where the sum is taken over all the transport channels i in the j-th TFC.
Moreover, define the variable $$L_{ref} = \sum_i \frac{1}{SF_i}$$

where SFi is the spreading factor of DPCH i and the sum is taken over all DPCH i used in the reference TFC.
Similarly, define the variable $$L_j = \sum_i \frac{1}{SF_i}$$

where the sum is taken over all DPCH i used in the j-th TFC.
The factor X for the j-th TFC is then preferably computed as:

$$X = \sqrt{\frac{L_{ref}}{L_j}} \times \sqrt{\frac{K_j}{K_{ref}}}$$

and the gain factor βj that is applied by processor 15 for the CCTrCH when using the jth TFC is preferably calculated as:

$$\beta_j = \sqrt{\frac{L_{ref}}{L_j}} \times \sqrt{\frac{K_j}{K_{ref}}} \times \beta_{ref}$$

The same computation of the gain factor βj is preferably used when determining for both "signaled gain factors" in the receiving WTRU 30 and "computed gain factors" in the transmitting WTRU 10. However, in downlink transmissions in 3GPP CDMA systems, for example, only a fixed set of values can be signaled to a transmitting WTRU 10. Accordingly, for the UE "signaled gain factors", where such limitations occur, a quantized gain value, i.e. βj quantized, is preferably determined by processing device 50 and sent to the transmitting WTRU10. For a 3GPP CCTrCH, currently allowed quantized β-values are given in TS 25.331 and are shown in Table 1.

TABLE 1

| Fixed Signaled Gain Factor Values | |
|---|---|
| Signalling value for $\beta_j$ | Quantized value $\beta_j$ |
| 15 | 16/8 |
| 14 | 15/8 |
| 13 | 14/8 |
| 12 | 13/8 |
| 11 | 12/8 |
| 10 | 11/8 |

TABLE 1-continued

| Fixed Signaled Gain Factor Values | |
|---|---|
| Signalling value for $\beta_j$ | Quantized value $\beta_j$ |
| 9 | 10/8 |
| 8 | 9/8 |
| 7 | 8/8 |
| 6 | 7/8 |
| 5 | 6/8 |
| 4 | 5/8 |
| 3 | 4/8 |
| 2 | 3/8 |
| 1 | 2/8 |
| 0 | 1/8 |

Note that there are 16 possible quantized values, they are in between ⅛ and 2, with steps of ⅛.

In accordance with the teachings of the present invention, quantized βj is preferably determined by first determining βj as a proportional value of βref as described above. Accordingly, for a 3GPP CCTrCH using the jth TFC preferably:

$$\beta_j = \sqrt{\frac{L_{ref}}{L_j}} \times \sqrt{\frac{K_j}{K_{ref}}} \times \beta_{ref}$$

The quantized βj (βj quantized) is then preferably determined as follows:

$$\beta_{j,quantized} = \begin{cases} \frac{\lceil 8 \times \beta_j \rceil}{8}, & \text{if } \beta_j < 2 \\ 2, & \text{if } \beta_j \geq 2 \end{cases}$$

where ⌈x⌉ represents the smallest integer greater than or equal to x. This is a conservative approach that gives a value of β higher than the actual value calculated.

Examples of alternative preferred determinations of the quantized βj (βj quantized) include the following formulations:

$$\beta_{j,quantized} = \begin{cases} 0.125, & \text{if } \beta_j \leq 0.125 \\ \frac{\lfloor 8 \times \beta_j \rfloor}{8}, & \text{if } 0.125 < \beta_j < 2 \\ 2, & \text{if } \beta_j \geq 2 \end{cases}$$

or $$\beta_{j,quantized} = \begin{cases} 0.125, & \text{if } \beta_j \leq 0.125 \\ \frac{\lfloor 8 \times \beta_j + 0.5 \rfloor}{8}, & \text{if } 0.125 < \beta_j < 2 \\ 2, & \text{if } \beta_j \geq 2 \end{cases}$$

or $$\beta_{j,quantized} = \begin{cases} 0.125, & \text{if } \beta_j \leq 0.125 \\ \frac{\lfloor 8 \times \beta_j \rfloor}{8}, & \text{if } 0.125 < \beta_j < 1 \\ \frac{\lceil 8 \times \beta_j \rceil}{8}, & \text{if } 1 \leq \beta_j < 2 \\ 2, & \text{if } \beta_j \geq 2 \end{cases}$$

-continued or $$\beta_{j,quantized} = \begin{cases} \frac{\lceil 8 \times \beta_j \rceil}{8}, & \text{if } \beta_j < 1 \\ \frac{\lfloor 8 \times \beta_j \rfloor}{8}, & \text{if } 1 \leq \beta_j < 2 \\ 2, & \text{if } \beta_j \geq 2 \end{cases}$$

where $\lfloor x \rfloor$ represents the largest integer smaller than or equal to x. In all the above formulations, gain factor values below ⅛ are preferably rounded up to ⅛ and values above 2 are preferably rounded down to 2. For better performance, it is preferred that the reference TFC, TFCref, be chosen so that all gain factor values are greater than ⅛ and less than 2.

As another aspect of the invention, problems arising in power control maintenance during reconfiguration are hereafter addressed. As noted above, the inventors have recognized the need for power control to re-converge based on new puncturing/repetition of TFCs. If new gain factors are computed or selected which do not result in the same output power levels after reconfiguration relative to puncturing/repetition, re-convergence is required.

For example, DTX (Discontinuous Transmission) is conventionally applied to 3GPP CCTrCHs mapped to dedicated and shared physical channels (PUSCH, PDSCH, UL DPCH and DL DPCH), when the total bit rate of the CCTrCH differs from the total channel bit rate of the physical channels allocated to this CCTrCH. Rate matching is used in order to completely fill physical channels that are only partially filled with data. In the case that after rate matching and multiplexing no data at all is to be transmitted in a physical channel, that physical channel is discarded from transmission. When only part of the physical channels are discarded, the CCTrCH is in partial DTX. When there is no data at all to send, the CCTrCH is in DTX. In DTX the usage of special bursts applies.

Because of partial DTX, the puncturing/repetition depends not only on the total number of resource units assigned, i.e. total data rate, but also on the spreading factor of the physical channels assigned. For example, if a single physical channel with a spreading factor (SF) of 1 is assigned to the CCTrCH (i.e., 16 resource units), even if the number of bits to be sent is small, repetition will be performed to completely fill that physical channel. If, instead, two physical channels with SF of 2 are assigned to the CCTrCH (similarly providing 16 resource units, 8 per channel), where the bits to be sent all fit in one SF2 physical channel, the second physical channel is discarded. In this case the percentage of repetition will be smaller than the case of a single SF1. Therefore, the amount of puncturing/repetition depends on the TFC being used (number of bits to be sent) and the physical channel configuration.

The first time physical channels are configured for a CCTrCH, gain factors are defined for each TFC in a transport format combination set (TFCS) for the CCTrCH. After successful physical channel establishment, an uplink outer power control algorithm converges to a given SIR target. This SIR target is based on gain factors currently configured for that channel (i.e., it is based on the amount of puncturing/repetition caused by that physical channel configuration).

During a physical channel reconfiguration procedure, there may be a change in the spreading factors, which may change the puncturing/repetition for each TFC. If "computed gain factors" are used, and the reference TFC and the reference gain factor (βref) are kept the same, the WTRU re-calculates the gain factor values for all TFCs based on the old reference TFC and reference gain factor and the new physical channel configuration. This can result in gain factors that do not yield the same output power relative to the puncturing/repetition for which power control has already converged.

If "signaled gain factors" are used, the RNC has two options: keep the same gain factor values for all TFCs or send new gain factors. Unless the puncturing/repetition for each TFC before and after the new configuration is similar, keeping the gain factors the same will result in the need for power control to re-converge. Accordingly, it would be preferable to send new gain factors.

For the determination of new gain factors, it is advantageous to re-calculate the values based on a reference TFC to be proportional to a reference gain factor βref as set forth above. Where the reference TFC and the reference gain factor (βref) are kept the same, the gain factor values for all TFCs based on the old reference TFC and reference gain factor and the new physical channel configuration preferably are re-calculated since changes are most likely to have occurred in the X factor which is preferably based on spreading factor and rate matching parameters as set forth above. Similar to "computed gain factors", this can result in gain factors that do not yield the same output power relative to the puncturing/repetition for which power control has already converged. Thus, the choice of the reference TFC and the reference gain factor value is extremely important for both "computed gain factors" and "signaled gain factors".

The following example is illustrates how a reconfiguration can change the relationship between the gain factor values (i.e., output power) and the puncturing/repetition level. Although the gain factor values presented in the example are not quantized, the example applies for both "compute gain factors" or "signaled gain factors". In uplink power control for a 3GPP CCTrCH, signaled gain factors are preferably quantized by the UTRAN before being signaled to a WTRU.

For simplicity, in this first example, βref is assumed to be equal to one and the Rate Matching attribute is assumed to be chosen to be the same value for all transport channels of the CCTrCH. However, the same problems and solutions apply when βref is not one and when the RM attributes of the transport channels are not equal.

For illustrative purposes, this example selects an uplink configuration for a 128 Kbps Radio Access Bearer (RAB) where the RAB is composed by a 128 Kbps dedicated traffic channel (DTCH) and a 3.4 Kbps Signaling Radio Bearer (SRB). The configuration of this RAB is shown in Tables 2 and 3 and the TFCS for this CCTrCH is defined in Table 4.

TABLE 2

| Transport channel configuration for UL128 kbps PS RAB | | |
|---|---|---|
| Higher Layer | RAB/Signalling RB | RAB |
| RLC | Logical channel type | DTCH |
|  | RLC mode | AM |
|  | Payload sizes, bit | 320 |
|  | Max data rate, bps | 128000 |
|  | AMD PDU header, bit | 16 |
| MAC | MAC header, bit | 0 |
|  | MAC multiplexing | N/A |

TABLE 2-continued

Transport channel configuration for UL128 kbps PS RAB

| Higher Layer | RAB/Signalling RB | | RAB |
|---|---|---|---|
| Layer 1 | TrCH type | | DCH |
| | TB sizes, bit | | 336 |
| | TFS | TF0, bits | 0x336 |
| | | TF1, bits | 1x336 |
| | | TF2, bits | 2x336 |
| | | TF3, bits | 3x336 |
| | | TF4, bits | 4x336 |
| | | TF5, bits | 8x336 |
| | TTI, ms | | 20 |
| | Coding type | | TC |
| | CRC, bit | | 16 |
| | Max number of bits/TTI after channel coding | | 8460 |
| | Max number of bits/radio frame before rate matching | | 4230 |
| | RM attribute* | | 120-160 |

*A range of rate matching attributes is defined for each TrCH of the RAB. Since the ranges of the RM attribute of the DTCH and the SRB overlap from 155-160, the same value can be chosen for the two transport channels as is assumed in this example for simplicity.

TABLE 4

TFCS For Example CCTrCH

| TFC | (128 Kbps DTCH, SRB) |
|---|---|
| TFC1 | (TF1, TF0) |
| TFC2 | (TF2, TF0) |
| TFC3 | (TF3, TF0) |
| TFC4 | (TF4, TF0) |
| TFC5 | (TF5, TF0) |
| TFC6 | (TF1, TF1) |
| TFC7 | (TF2, TF1) |
| TFC8 | (TF3, TF1) |
| TFC9 | (TF4, TF1) |
| TFC10 | (TF5, TF1) |

TABLE 3

Transport channel configuration for UL 3.4 kbps SRB for DCCH

| | RAB/signalling RB | | SRB#1 | SRB#2 | SRB#3 | SRB#4 |
|---|---|---|---|---|---|---|
| Higher layer | User of Radio Bearer | | RRC | RRC | NAS_DT High priority | NAS_DT Low priority |
| RLC | Logical channel type | | DCCH | DCCH | DCCH | DCCH |
| | RLC mode | | UM | AM | AM | AM |
| | Payload sizes, bit | | 136 | 128 | 128 | 128 |
| | Max data rate, bps | | 3400 | 3200 | 3200 | 3200 |
| | AMD/UMD PDU header, bit | | 8 | 16 | 16 | 16 |
| MAC | MAC header, bit | | 4 | 4 | 4 | 4 |
| | MAC multiplexing | | 4 logical channel multiplexing | | | |
| Layer 1 | TrCH type | | DCH | | | |
| | TB sizes, bit | | 148 | | | |
| | TFS | TF0, bits | 0x148 | | | |
| | | TF1, bits | 1x148 | | | |
| | TTI, ms | | 40 | | | |
| | Coding type | | CC 1/3 | | | |
| | CRC, bit | | 16 | | | |
| | Max number of bits/TTI before rate matching | | 516 | | | |
| | Max number of bits/radio frame before rate matching | | 129 | | | |
| | RM attribute | | 155-165 | | | |

Two possible physical channel configurations are considered for this first example CCTrCH as set forth in Table 5.

TABLE 5

Physical Channel Configurations For First Example

| | | Physical Configuration 1 | Physical Configuration 2 |
|---|---|---|---|
| DPCH Uplink | Midamble | 256 chips | 256 chips |
| | Codes and time slots | SF2 × 1 code × 1 timeslot + SF16 × 1 code × 1 time slot | SF4 × 1 code × 2 timeslots + SF16 × 1 code × 1 time slot |
| | Max. Number of data bits/radio frame | 2340 bits | 5376 bits |
| | TFCI code word | 16 bits | 16 bits |
| | TPC | 2 bits | 2 bits |
| | Puncturing Limit | 0.52 | 0.52 |

Whether physical channel configuration 1 or 2 is used depends on cell availability when the channel is configured, e.g., if one SF2 code is not available, then two SF4 codes may be used instead.

For this first example, when the channel is configured for the first time, physical channel configuration 1 is used. Accordingly, the gain factors are determined based on the physical channel configuration 1 using the preferred formulation above. For the example, TFC3 is selected as the reference TFC chosen is TFC3 and the table of FIG. 4 shows the gain factors for each TFC, accordingly.

If a reconfiguration is then required, new gain factors are calculated. For example, if reconfiguration is to physical configuration 2 and the reference TFC and the gain factor remain the same (i.e., TFCref is TFC3 and $\beta_{ref}=1$), the recalculated gain factors are shown in the table of FIG. 5.

Figure 6:
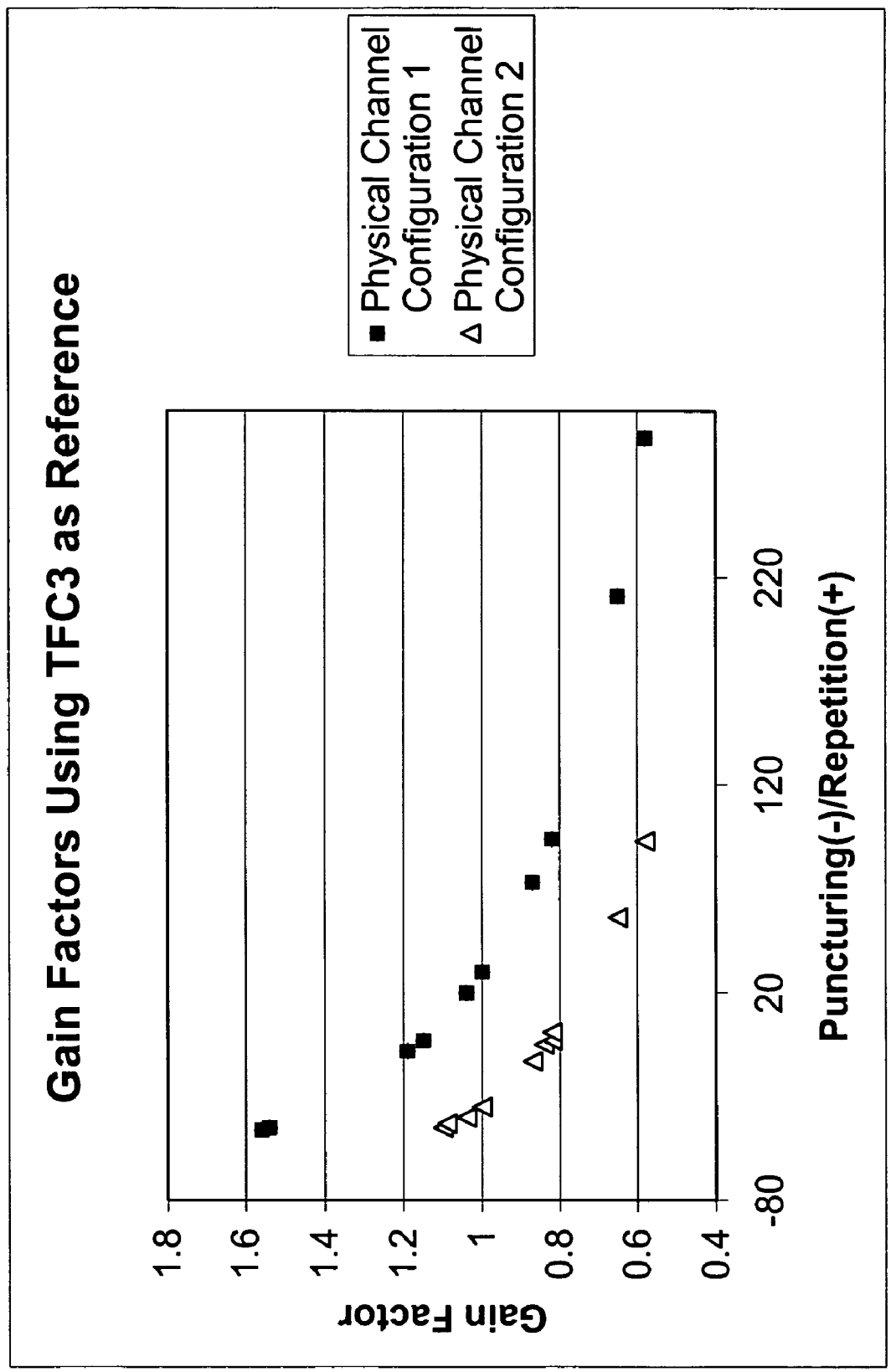
FIG. 6 is a comparative graph of Gain Factors when Using TFC3 as a Reference for the first example.

Gain factor as a function of puncturing/repetition for both configurations when TFC3 is used as reference is shown in the graph of FIG. 6. The gain factor values shown are not quantized. Quantization of the reference gain factor is not needed in case of "computed gain factors". In that case, the gain factor values determined by the transmitting WTRU 10 are as shown in FIGS. 4 and 5. Quantization is needed in case of "signaled gain factors" for an uplink 3GPP CCTrCH, in which case the values signaled would be the quantized version of the values shown in FIGS. 4 and 5 for this first example.

In this first example, in configuration 1, TFC3 yields 30% repetition and, in configuration 2, TFC3 yields 35% puncturing, but the gain factor values are the same in both cases (i.e. equal to 1). If the uplink outer loop power control had converged for the beta values given for physical channel configuration 1, and the SIR target value is not updated during reconfiguration, then a new convergence will be required. In this first example the power in configuration 2 is most likely be too low and SIR target is needed to increase.

Two solutions are provided as follows:
1. Intelligent selection of reference TFC: Maintain the SIR target (send the latest value determined by the outer loop power control algorithm to WTRU 10 in the reconfiguration message) and
   a. maintain existing reference TFC and βref if the original selection is chosen such that it will provide similar output power levels for similar puncturing/repetition in the new configuration of the CCTrCH, or
   b. select a new reference TFC or a new βref.
2. Update the SIR target value based on changes of gain factor values and send the SIR target value to the WTRU 10 in the reconfiguration message. In this case βref will remain the same, but the gain factor for all other TFCs in the TFCS may change.

Intelligent selection of the reference TFC maintains the SIR target and intelligently selects the reference TFC and βref. Three cases can be considered when the physical channels are reconfigured:
   Case 1: Selection of reference TFC when all possible physical configurations for the CCTrCH are known and there is a common TFC that yields similar puncturing/repetition for all physical channel configurations involved;
   Case 2: Selection of reference TFC when all allowed configurations are not known or when it is not possible to find a common TFC that yields similar puncturing/repetition for all physical channel configurations involved; and
   Case 3: Selection of reference TFC when it is not possible to find a TFC in the new configuration that yields similar puncturing/repetition to that of the reference TFC in the old configuration.

For the first case it is preferred to maintain the reference TFC and the reference gain factor value. In this case, the reference TFC is selected to be one that has similar amount of puncturing/repetition for all configurations allowed to that CCTrCH. The same reference TFC and reference gain factor are used in all physical channel configurations of the CCTrCH. The reference TFC and reference gain factor are chosen when the channel is configured for the first time, and remain the same during all following reconfigurations.

For the second case it is preferred to change the reference TFC and maintain the reference gain factor value. In this case, a new reference TFC is selected that has a similar puncturing/repetition to that of the reference TFC in the old configuration. Also, the gain factor βref for the new reference TFC remains the same during the reconfiguration.

For the third case it is preferred to maintain the reference TFC and change the reference gain factor value. In this case, the same reference TFC is used but the reference gain factor βref is changed. The new reference gain factor is determined by using as a reference the same reference TFC that was used in the old configuration.

For all of the cases above, even if the reference TFC and/or reference gain factor value βref remains the same, the gain factor values for all other TFCs in the TFCS are preferably recalculated as long as there are changes in spreading factors (i.e., changes in the values of Lj).

Although less preferred, the usage of the selection process defined for Case 2 can be used in the scenario of Case 1 and the process defined in Case 3 can be used in the scenarios of either Case 1 or Case 2.

For TFCS reconfiguration employing intelligent selection, a first preferred alterative is to change the reference TFC and maintain the reference gain factor value. Preferably this is done by choosing the new reference TFC to be one that has a similar puncturing/repetition to that of the reference TFC in the old configuration. The gain factor for the new reference TFC then preferably remains the same during the reconfiguration. A second preferred alterative is to change the reference gain factor value. Preferably, the new reference TFC can be any TFC in the TFCS (the same as the old one or a different one). The gain factor for the new reference TFC is preferably determined using as a reference, the βref that was used in the old configuration.

For the case of TFCS configuration, even if the reference TFC and/or reference gain factor value remains the same, the gain factor values for all other TFCs in the TFCS are preferably recalculated as long as there are changes in the number of bits of a given transport channel (i.e., changes in the values of Kj). However, in a case in which physical channel and/or TFCS reconfiguration results in similar puncturing/repetition before and after reconfiguration, an acceptable alternative is to not update either the reference TFC or reference gain factor.

For Case 1 above, when all possible physical channel configurations are known in advance, the TFC that yields similar amount of puncturing/repetition for all configurations allowed to that CCTrCH is preferably chosen as the reference TFC for all configurations. The gain factor for the reference TFC (βref) are also preferably the same for all configurations.

In case of "computed gain factors", the receiving WTRU 30 preferably signals the reference TFC and the reference gain factor (βref) to the transmitting WTRU 10 the first time the CCTrCH is configured. The transmitting WTRU 10 then calculate the gain factor for all other TFCs using preferably the method provided above. Following a physical channel reconfiguration, the transmitting WTRU 10 uses the previously identified reference TFC and reference gain factor to calculate the new gain factors for all the TFCs in the TFCS.

In case of "signaled gain factors" the receiving WTRU 30 preferably uses the chosen reference TFC to determine the gain factor for all TFCs in the TFCS and signals those values to the transmitting WTRU 10 the first time the CCTrCH is configured. For a 3GPP CCTrCH those values are preferably quantized. The receiving WTRU 30 preferably uses the method described above to determine the gain factors for all other TFCs based on the reference TFC. When a physical channel reconfiguration is performed, the receiving WTRU 30 uses the previously identified reference TFC and reference gain factor to calculate the new gain factors using updated X values for all the TFCs in the TFCS and signals the new gain factors to the transmitting WTRU 10.

For a 3GPP CCTrCH, the reference gain factor (βref) are preferably, any value from ⅛ to 2, with steps of ⅛. It is preferred that the reference TFC and the gain factor (βref) are chosen so that all gain factor values for the other TFCs are greater than ⅛ and less than 2. Also, no change in the gain factors is needed if the physical channel reconfiguration does not change the spreading factors.

In the first example above, the reference TFC, TFC3 yields 30% repetition in physical configuration 1 and 35% puncturing in physical configuration 2. However, TFC4 yields 3% puncturing in physical configuration 1 and 1% repetition in physical configuration 2. The values for TFC4 are much closer to each other than TFC3, and therefore it would be preferred to choose TFC4 as reference TFC for the case 1 scenario.

Figure 7:
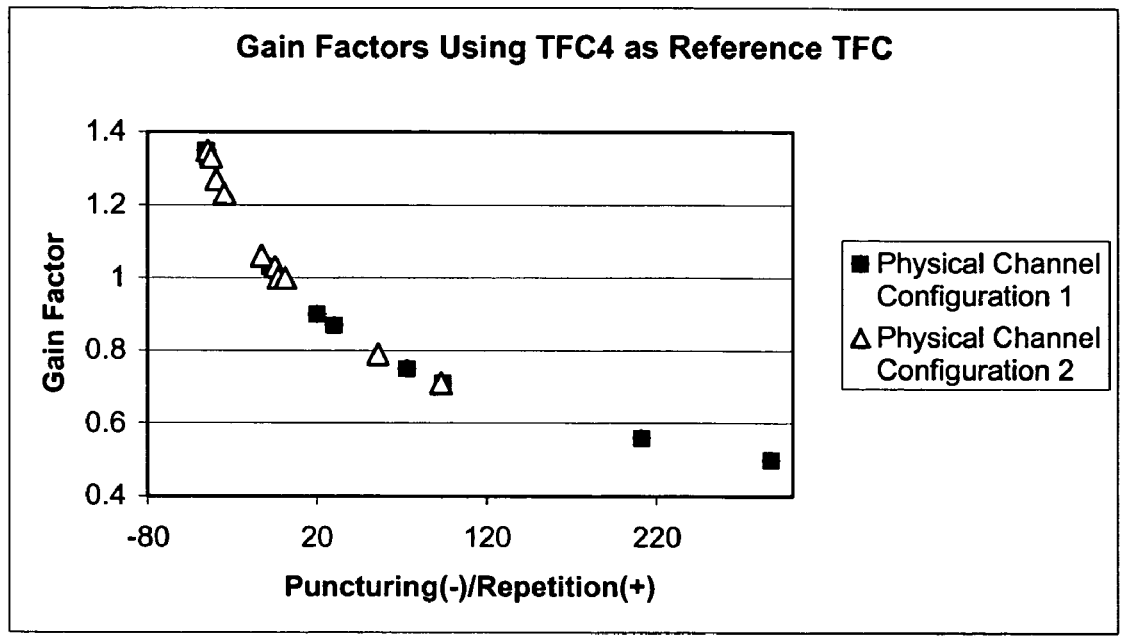
FIG. 7 is a comparative graph of Gain Factor as a Function of Puncturing/Repetition when Using TFC4 as a Reference TFC, βref=1 for a second example.

For the case 1 scenario, a modification of the first example is provided as a second example in connection with FIGS. 7, 9 and 10. Gain factor as a function of puncturing/repetition for both configurations 1 and 2 when TFC4 is used as reference for the second example is shown in the graph of FIG. 7. Comparing the graph in FIG. 7 with the one shown in FIG. 6 we observe that the two curves are much closer together.

Figure 8:
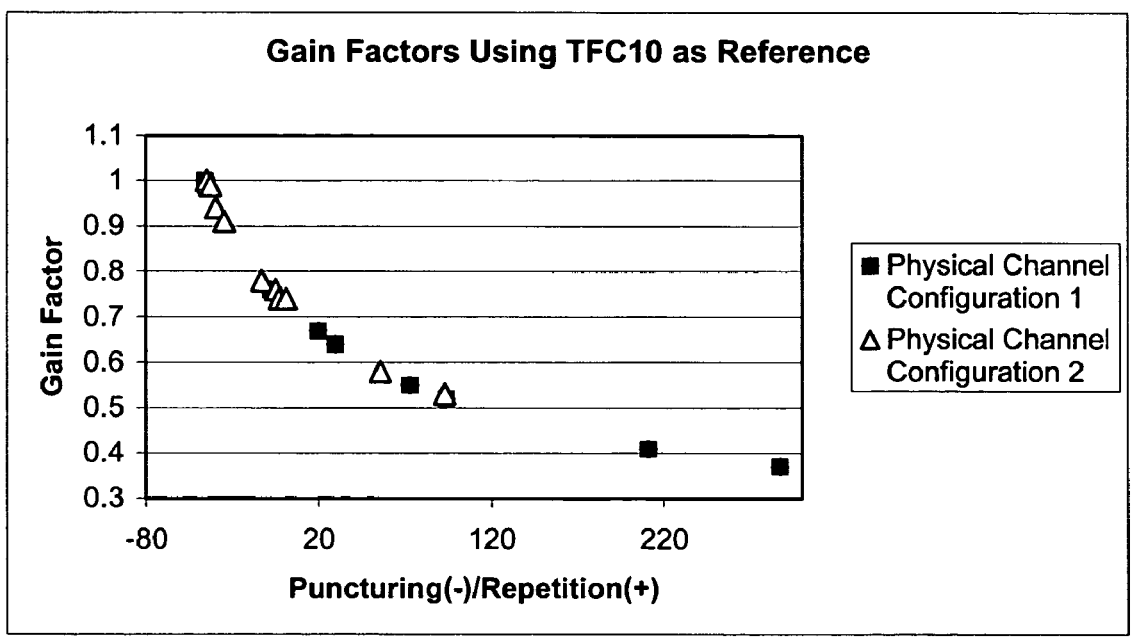
FIG. 8 is a comparative graph of Gain Factors as a Function of Puncturing/Repetition when Using TFC10 as a Reference TFC, βref=1 for a third example.

Also for the case 1 scenario, a modification of the first example is provided as a third example in connection with FIGS. 8, 9 and 10, where TFC10 is chosen as a reference. TFC10 yields 46% puncturing in physical configuration 1 and 45% puncturing in physical configuration 2. FIG. 8 shows the gain factor as a function of puncturing/repetition for both configurations when TFC10 is used as reference for a third example. The figure shows that similarly good results are obtained in this case.

Where either TFC4 or TFC10 is used as reference, the curve that represents the gain factor as a function of puncturing/repetition for physical configuration 2 overlaps the one for physical configuration 1. The gain factor value for a given puncturing/repetition is approximately the same for both configurations. The gain factor values shown are not quantized.

The tables of FIGS. 9 and 10 show the detailed results for the two physical configurations, respectively, with respect to both the second and third examples.

As for the first example, for simplicity in the second and third examples, βref is chosen to be equal to one and the Rate Matching attribute is assumed to be chosen to be the same value for all transport channels of the CCTrCH. The same problems and solutions apply when βref is not one and when the RM attributes of the transport channels are not equal.

The foregoing Case 1 solution is preferred only when all the possible physical configurations assigned to the CCTrCH are known in advance. The solution is simple when there are only two physical configurations involved. If there are more than two configurations involved, it can become difficult to find a common TFC that results in similar puncturing/repetition for all physical channel configurations involved.

For case 2, when the configurations are not known in advance, or when it is not possible to find a common TFC that yields similar puncturing/repetition for all physical channel configurations involved, a new reference TFC is preferably chosen during reconfiguration. The new reference TFC chosen is preferably the one that has similar puncturing/repetition to that of the reference TFC in the old configuration. The gain factor for the new reference TFC (βref) preferably remains the same during the reconfiguration.

In case of "computed gain factors", the receiving WTRU 30 signal preferably the new reference TFC and the (unchanged) reference gain factor (βref) to the transmitting WTRU 10 in a reconfiguration message. Even though the reference gain factor does not change, it is preferably sent in the reconfiguration message. In 3GPP, it is required to send a gain factor value when sending a reference TFC. The transmitting WTRU 10 then calculates the gain factor for all other TFCs.

In case of "signaled gain factors", the receiving WTRU 30 preferably uses the new chosen reference TFC and the (unchanged) reference gain factor (βref) to determine the gain factor for all TFCs in the TFCS and signal those values, preferably quantized in the 3GPP context, to the transmitting WTRU 10. In either case, gain factors are preferably calculated using the preferred formulations disclosed above.

For the case 2 scenario, if TFC3 is chosen as reference for the initial configuration (configuration 1), the reference TFC in configuration 2 is preferably selected as a TFC that yields around 30% repetition. A fourth example based on a modification of the first example for case 2 is described in connection with FIGS. 4, 11 and 12. The closest value to TFC3 is TFC6 that yields 56% repetition. This TFC has the same gain factor as TFC3 had in physical configuration 1 (a gain factor equal to 1 for the example given).

Figure 11:
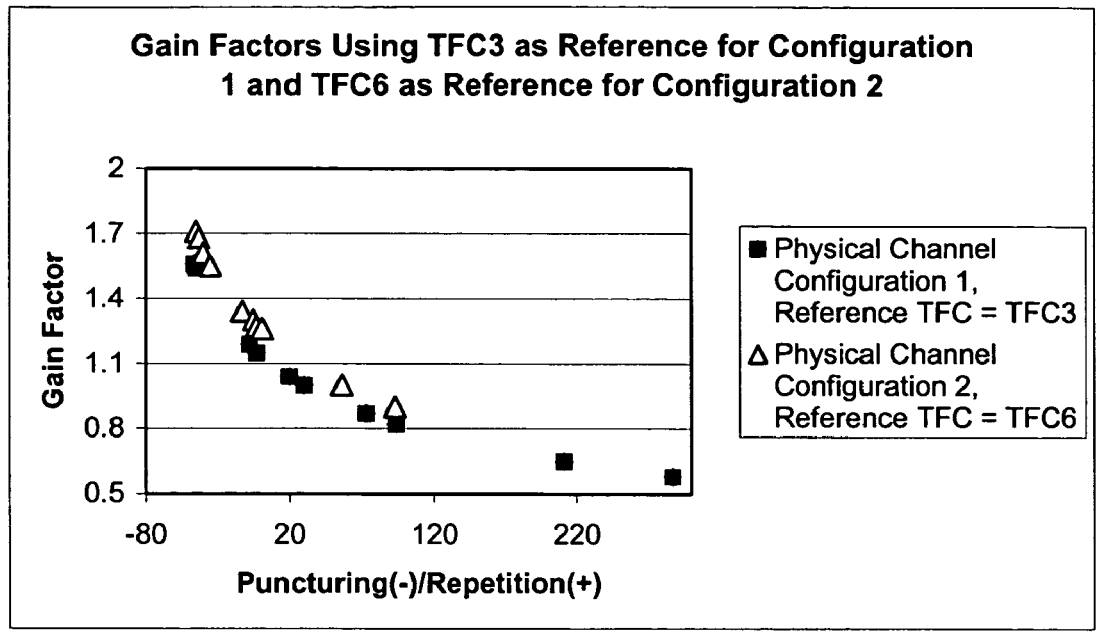
FIG. 11 is a comparative graph of Gain Factor as a Function of Puncturing/Repetition when Using TFC3 as a Reference for Physical Configuration 1 and TFC6 as a Reference for Physical Configuration 2 for a fourth example.

FIG. 11 shows the gain factor as a function of puncturing/repetition for both configurations when TFC3 is used as reference in physical channel configuration 1 and TFC6 is used as reference in physical channel configuration 2 as the fourth example. The gain factor values shown are not quantized. Because there is a relatively large difference between the repetition in configuration 1 and 2 (26% difference), the two curves are not as close as they were in the Case 1 examples illustrated in FIG. 7 and FIG. 8, but they are still much better than the results shown in the FIG. 6 graph reflective of the first example.

The table of FIG. 12 shows the detailed results for physical configuration 2 when the reference TFC is TFC6 in this fourth example. This fourth example follows from the first example in which, for simplicity, βref is chosen to be equal to one and the Rate Matching attribute is assumed to be chosen to be the same value for all transport channels of the CCTrCH. The same problems and solutions for case 2 apply when βref is not one and when the RM attributes of the transport channels are not equal.

For Case 3, when it is not possible to find a TFC in the new configuration that yields similar puncturing/repetition to that of the reference TFC in the old configuration, a new reference TFC is preferably chosen during reconfiguration. The new reference TFC can be any TFC in the TFCS including the current reference TFC. The gain factor for the new reference TFC (βref,new) is preferably determined using as a reference the same reference that was used in the old configuration, as follows:

$$\beta_{ref,new} = \sqrt{\frac{L_{ref,old}}{L_{ref,new}}} \times \sqrt{\frac{K_{ref,new}}{K_{ref,old}}} \times \beta_{ref,old}$$

i.e., the old configuration (old spreading factors), and the old βref are used as a reference to determine a new βref.

Where the new reference TFC is chosen to be the same as the old reference TFC, Kref,new=Kref,old, and accordingly the preferred calculation is then:

$$\beta_{ref,new} = \sqrt{\frac{L_{ref,old}}{L_{ref,new}}} \times \beta_{ref,old}$$

This new reference gain factor is used as a reference to determine the gain factors for all other TFCs in the new configuration. Accordingly, βref,new is used βref for calculating βj gain factors for the jth TFC preferably using the preferred formulations above.

Figure 13:
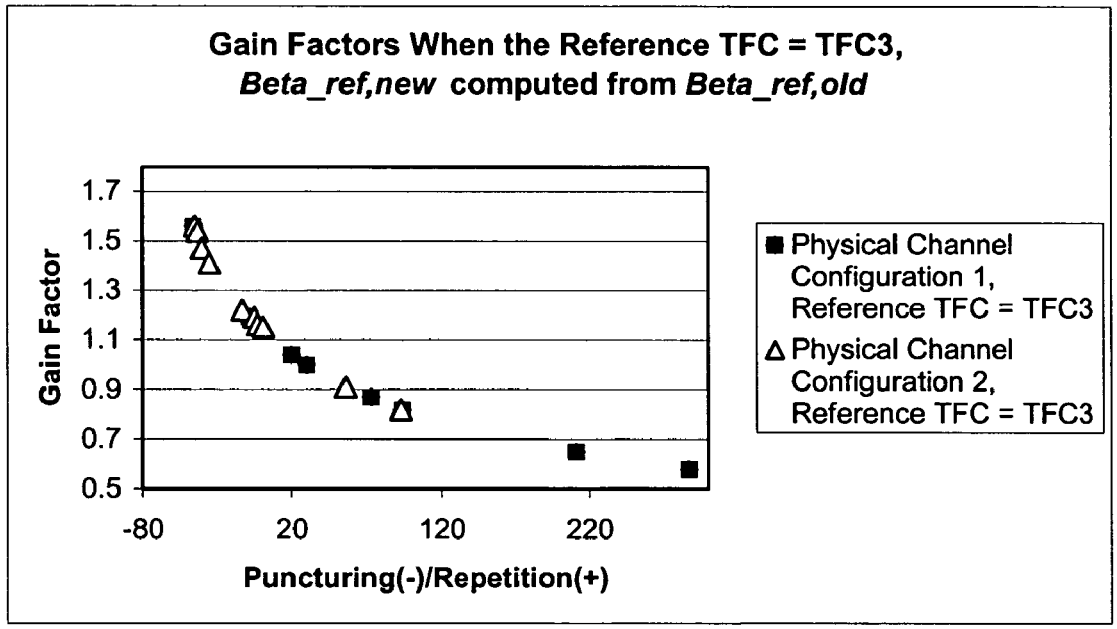
FIG. 13 is a comparative graph of Gain Factor as a Function of Puncturing/Repetition when Using TFC3 as a Reference for Physical Configuration 1 and Physical Configuration 2 and βref,new computed from βref,old for a fifth example.

For the case 3 scenario, a further modification of the first example is provided as a fifth example in connection with FIGS. 4, 13 and 14. In the fifth example, TFC3 is chosen as the new reference TFC, i.e., the same as the old reference TFC in the first example. With physical configuration 1 as the old configuration, physical configuration 2 as the new configuration, and TFC3 as the old and new reference TFC:

Lref,old=½(physical configuration=SF2×1 code×1 timeslot)

Lref,new=¼(physical configuration=SF4×1 code×1 timeslot)

βref,old=1 so:

$$\beta_{ref,new} = \sqrt{\frac{1/2}{1/4}} \times 1 = 1.41$$

FIG. 13 shows the gain factor as a function of puncturing/repetition for both configurations for the case when TFC3 is used as reference in physical configurations 1 and 2 and the new reference gain factor is determined for this fifth example. Comparing the graph of FIG. 13 with the one shown in FIG. 6, it is observed that the two curves are much closer together, showing that the gain factor value for a given puncturing/repetition is approximately the same for both cases. In FIG. 13, the curve for physical configuration 2 practically overlaps the one for physical configuration 1 (i.e., the gain factor value for a given puncturing/repetition is approximately the same for both configurations).

The table of FIG. 14 shows the detailed results for physical configuration 2 when the new reference TFC remains as TFC3 and the new reference gain factor is determined from the old reference gain factor as in the fifth example.

The gain factor values are not quantized. For a 3GPP CCTrCH, quantization is necessary in order to send the values to the transmitting WTRU 10, since the reference gain factor is not equal to 1 or a multiple of ⅛. Thus, the gain factor values determined by the transmitting WTRU 10 for all other TFCs for the case of "computed gain factors" are slightly different from the values shown in this fifth example. In case of "signaled gain factors", all gain factor values signaled are preferably the quantized version of the values shown in this fifth example for a 3GPP CCTrCH.

In case of "computed gain factors", in order to minimize the quantization error, preferably the receiving WTRU 30 chooses the new reference TFC to be the one that will yield the new reference gain factor whose unquantized value is closest to its quantized gain factor value.

The three cases discussed above assumed that the only parameters that changed in the TFCS during the TFCS reconfiguration are the gain factors. There are cases in which there is a need to reconfigure the transport formats thus affecting the data rate. In such cases, it is also desirable to intelligently select a new reference TFC. The selection is preferably done using the solutions presented in connection with the cases explained above.

In other words, there are two preferred choices during a TFCS reconfiguration. One preferred option is to choose the new reference TFC to be one that has a similar puncturing/repetition to that of the reference TFC in the old configuration. The gain factor for the new reference TFC (βref) should remain the same during the reconfiguration. This is similar to case 1 or 2 as illustrated by the second, third and fourth examples.

The other preferred option is to choose the new reference TFC to be any TFC in the TFCS, including the old reference TFC. The gain factor for the new reference TFC (βref,new) should be determined using as a reference the same reference that was used in the old configuration, as follows:

$$\beta_{ref,new} = \sqrt{\frac{L_{ref,old}}{L_{ref,new}}} \times \sqrt{\frac{K_{ref,new}}{K_{ref,old}}} \times \beta_{ref,old}$$

i.e., the old configuration (old spreading factors), and the old βref are used as a reference to determine a new βref. Where the new reference TFC is chosen to be the same as the old reference TFC, Kref,new=Kref,old, the calculation is simplified as:

$$\beta_{ref,new} = \sqrt{\frac{L_{ref,old}}{L_{ref,new}}} \times \beta_{ref,old}$$

The new reference gain factor is then used as a reference to determine the gain factors for all other TFCs in the new configuration. This is similar to case 3 as illustrated by the fifth example.

As an alternative to intelligent selection, the SIR target can be updated during physical channel reconfiguration based on changes in gain factors. In the above discussion of intelligent selection, the SIR Target was not changed during reconfiguration, i.e., the latest update from the UL outer loop power control algorithm is sent to the transmitting WTRU 10 in the reconfiguration message. An alternative solution described below entails an update of the SIR target during physical channel reconfiguration.

In this case, the reference TFC and the reference gain factor remain the same during the physical channel reconfiguration. The SIR target is re-calculated based on changes that anticipated in the reference gain factor value in order to maintain power control.

Preferably, the SIR target is updated as follows. Preferably, an adjustment factor βadj is determined based on the gain factor βref for the reference TFC and the new physical channel configuration that is selected to maintain power control, as follows:

$$\beta_{adj} = \sqrt{\frac{L_{ref1}}{L_{ref2}}} \times \beta_{ref}$$

where $$L_{refl} = \sum_i \frac{1}{SF_i}$$

where SFi is a spreading factor of a dedicated physical channel (DPCH) i with respect to the first physical configuration and the sum is taken over all DPCH i used in TFCref; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref.

The new SIR target is then given as:

$$SIR\_target_{new} = SIR\_target_{old} + 20\log\left(\frac{\beta_{adj}}{\beta_{ref}}\right) = SIR\_target_{old} + 10\log\left(\frac{L_{ref2}}{L_{refl}}\right)$$

In case the gain factor of the reference TFC of the old configuration was set to 1, the new SIR target is given by a simplified expression as:

$$SIR\_target_{new} = SIR\_target_{old} + 20 \log(\beta_{adj})$$

The updated SIR Target is then sent to the transmitting WTRU 10 in a reconfiguration message. The reference TFC and the reference gain factor (βref) remain the same, i.e. the adjustment factor βadj is only used for determining the updated SIR Target, but is not thereafter used as the gain factor.

In case of "computed gain factors", there is no need to re-send the reference TFC and βref in the reconfiguration message, since they remain the same. The transmitting WTRU 10 calculates the gain factor value for all other TFCs based on the old reference TFC and old reference gain factor. The transmitting WTRU 10 preferably uses the preferred formulations described above using the old reference gain factor.

In case of "signaled gain factors", during physical channel reconfiguration, the receiving WTRU 30 uses the reference TFC and βref to determine the gain factor for all TFCs in the TFCS and signal those values, preferably quantized for 3GPP CCTrCH context, to the transmitting WTRU 10. The gain factor value for all other TFCs may change due to the change in the physical channel configuration. The receiving WTRU 30 preferably uses the preferred formulations described above using the old reference gain factor.

For the case of "computed gain factors", the update of the SIR target has the advantage of minimizing signaling overhead, when compared to the intelligent selection methods presented above. Since the gain factors are part of the transport channel configuration, in order to inform the transmitting WTRU 10 of changes in these parameters, a "Transport Channel Reconfiguration" message has to be used, even if such changes are caused by a change in the physical channel configuration only. In case there are no changes in the transport channel configuration, a "Physical Channel Reconfiguration" message can be used instead. This message is preferred because it is shorter than the "Transport Channel Reconfiguration" message. For "computed gain factors", if the update of the SIR target is used, then no change in the reference TFC or reference gain factor is needed, i.e., no changes in the transport channel configuration. In this case, a "Physical Channel Reconfiguration" message can be used to inform the transmitting WTRU 10 of the reconfiguration, and signaling overhead is minimized.

Preferably, the components to determine the gain factors and quantized gain factors in either the transmitting WTRU 10 or receiving WTRU 30 are implemented on a single integrated circuit, such as an application specific integrated circuit (ASIC). However, the components may also be readily implemented on multiple separate integrated circuits or in software on general purpose CPUs/DSPs.

While this invention has been particularly shown and described with reference to preferred embodiments, it will be understood by those skilled in the art that various changes in form and details may be made therein without departing from the scope of the invention as described hereinabove.

What is claimed is:

1. A method of transmission power control for a wireless transmit receive unit (WTRU) that transmits communication signals in a forward composite channel carrying data in a selected combination of channels with respect to a selected physical transmission configuration of the forward composite channel, the method comprising:

transmitting communication signals in the forward composite channel in a selected combination of channels with respect to a first physical transmission configuration of the forward composite channel;

determining a reference combination of channels with respect to the first physical transmission configuration of the forward composite channel;

applying a gain factor β to the transmission of communication signals in the selected combination of channels with respect to the first physical transmission configuration of the forward composite channel where the gain factor β is determined based on spreading factors of the selected combination of channels and the reference combination of channels with respect to the first physical transmission configuration of the forward composite channel;

reconfiguring the transmission of communication signals in the forward composite channel to transmit the signals in a selected combination of channels with respect to a second physical transmission configuration of the forward composite channel;

determining a reference combination of channels with respect to the second physical transmission configuration of the forward composite channel; and applying a gain factor β' to the transmission of communication signals in the selected combination of channels with respect to the second physical transmission configuration of the forward composite channel where the gain factor β' is determined based on spreading factors of the selected combination of channels and the reference combination of channels with respect to the second physical transmission configuration of the forward composite channel.

2. The method of claim 1 where the WTRU is configured for use in a code division multiple access (CDMA) system, the data channels are transport channels (TrCHs) that may have different spreading factors for different physical configurations of the composite channel, the composite channel is an uplink coded composite transport channel (CCTrCH) and a transport format combination (TFC) is associated with each of a set of predefined format channel combinations of the CCTrCH defined for all physical configurations, the method wherein the reference combination of channels with respect to the first physical transmission configuration of the forward composite channel is determined to be one of set of predefined format channel combinations, TFCref1, that has an associated gain factor βref1 and the reference combination of channels with respect to the second physical transmission configuration of the forward composite channel is determined to be one of set of predefined format channel combinations, TFCref2, that has an associated gain factor βref2.

3. The method of claim 2 wherein a common TFC that yields similar puncturing/repetition for the first and second physical channel configurations is identified and the common TFC is determined to be the reference channel combination TFCref1 and also the reference channel combination TFCref2 and the gain factor βref2 is selected to equal the gain factor βref1.

4. The method of claim 2 wherein reference channel combination TFCref2 is determined by identifying a TFC that has similar puncturing/repetition for the second physical channel configuration as compared with puncturing/repetition of reference channel combination TFCref1 with respect to the first physical channel configuration and the gain factor βref2 is selected to equal the gain factor βref1.

5. The method of claim 2 wherein reference channel combination TFCref2 is selected to be the same TFC as reference channel combination TFCref1 and the gain factor βref2 is selected based on the gain factor βref1 and spreading factor changes in the reference channel combination from the first physical configuration to the second physical configuration of the forward composite channel.

6. The method of claim 5 wherein the gain factor βref2 is selected such that $$\beta_{ref2} = \sqrt{\frac{L_{ref1}}{L_{ref2}}} \times \beta_{ref1}$$

where $$L_{ref1} = \sum_i \frac{1}{SF_i}$$

where SFi is a spreading factor of a dedicated physical channel (DPCH) i with respect to the first physical configuration and the sum is taken over all DPCH i used in TFCref1; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref2.

7. The method of claim 2 wherein reference channel combination TFCref2 is selected to be the a different TFC as the reference channel combination TFCref1 and the gain factor βref2 is selected such that $$\beta_{ref2} = \sqrt{\frac{L_{ref1}}{L_{ref2}}} \times \sqrt{\frac{K_{ref2}}{K_{ref1}}} \times \beta_{ref1}$$

where:

$$K_{ref1} = \sum_i RM_i \times N_i$$

where RMi is a semi-static rate matching attribute for transport channel i, Ni is the number of bits output from a radio frame segmentation block for transport channel i and the sum is taken over all transport channels i in TFCref1 with respect to the first physical configuration;

$$K_{ref2} = \sum_i RM_i \times N_i$$

where RMi is a semi-static rate matching attribute for transport channel i, Ni is the number of bits output from a radio frame segmentation block for transport channel i and the sum is taken over all transport channels i in TFCref2 with respect to the second physical configuration;

$$L_{ref1} = \sum_i \frac{1}{SF_i}$$

where SFi is a spreading factor of a dedicated physical channel (DPCH) i with respect to the first physical configuration and the sum is taken over all DPCH i used in TFCref1; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref2.

8. The method of claim 2 wherein:
a jth combination of channels TFCj is selected for data transmission with respect to the first physical transmission configuration on the forward composite channel and a gain factor βj is applied that is computed for the selected combination of channels such that: βj=X*βref1 where X is based upon spreading factors of TFCj and TFCref1 with respect to the first physical transmission configuration of the forward composite channel; and
a kth combination of channels TFCk is selected for data transmission with respect to the second physical transmission configuration on the forward composite channel and a gain factor βk is applied that is computed for the selected combination of channels such that: βk=X'*βref2 where X' is based upon spreading factors of TFCk and TFCref2 with respect to the second physical transmission configuration of the forward composite channel.

9. The method of claim 8 wherein a common TFC that yields similar puncturing/repetition for the first and second physical channel configurations is identified and the common TFC is determined to be the reference channel combination TFCref1 and also the reference channel combination TFCref2 and the gain factor βref2 is selected to equal the gain factor βref1.

10. The method of claim 8 wherein reference channel combination TFCref2 is determined by identifying a TFC that has similar puncturing/repetition for the second physical channel configuration as compared with puncturing/repetition of reference channel combination TFCref1 with respect to the first physical channel configuration and the gain factor βref2 is selected to equal the gain factor βref1.

11. The method of claim 8 wherein reference channel combination TFCref2 is selected to be the same TFC as reference channel combination TFCref1 and the gain factor βref2 is selected based on the gain factor βref1 and spreading factor changes in the reference channel combination from the first physical configuration to the second physical configuration of the forward composite channel.

12. The method of claim 11 wherein the gain factor βref2 is selected such that $$\beta_{ref2} = \sqrt{\frac{L_{ref1}}{L_{ref2}}} \times \beta_{ref1}$$

where $$L_{ref1} = \sum_i \frac{1}{SF_i}$$

where SFi is a spreading factor of a dedicated physical channel (DPCH) i with respect to the first physical configuration and the sum is taken over all DPCH i used in TFCref1; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref2.

13. The method of claim 8 wherein reference channel combination TFCref2 is selected to be the a different TFC as the reference channel combination TFCref1 and the gain factor βref2 is selected such that $$\beta_{ref2} = \sqrt{\frac{L_{ref1}}{L_{ref2}}} \times \sqrt{\frac{K_{ref2}}{K_{ref1}}} \times \beta_{ref1}$$

where:

$$K_{ref1} = \sum_i RM_i \times N_i$$

where RMi is a semi-static rate matching attribute for transport channel i, Ni is the number of bits output from a radio frame segmentation block for transport channel i and the sum is taken over all transport channels i in TFCref1 with respect to the first physical configuration;

$$K_{ref2} = \sum_i RM_i \times N_i$$

where RMi is a semi-static rate matching attribute for transport channel i, Ni is the number of bits output from a radio frame segmentation block for transport channel i and the sum is taken over all transport channels i in TFCref2 with respect to the second physical configuration;

$$L_{ref1} = \sum_i \frac{1}{SF_i}$$

where SFi is a spreading factor of a dedicated physical channel (DPCH) i with respect to the first physical configuration and the sum is taken over all DPCH i used in TFCref1; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref2.

14. The method of claim 8 wherein the gain factor βj is computed such that $$\beta_j = \sqrt{\frac{L_{ref1}}{L_j}} \times \sqrt{\frac{K_j}{K_{ref1}}} \times \beta_{ref1}$$

where:

$$K_{ref1} = \sum_i RM_i \times N_i$$

where RMi is a semi-static rate matching attribute for transport channel i, Ni is the number of bits output from a radio frame segmentation block for transport channel i and the sum is taken over all transport channels i in TFCref1;

$$K_j = \sum_i RM_i \times N_i$$

where the sum is taken over all transport channels i in the TFCj;

$$L_{ref1} = \sum_i \frac{1}{SF_i}$$

where SFi is a spreading factor of a dedicated physical channel (DPCH) i and the sum is taken over all DPCH i used in TFCref1; and $$L_j = \sum_i \frac{1}{SF_i}$$

where the sum is taken over all DPCH i used in TFCj; and the gain factor βk is computed such that $$\beta_k = \sqrt{\frac{L_{ref2}}{L_k}} \times \sqrt{\frac{K_k}{K_{ref2}}} \times \beta_{ref2}$$

where:

$$K_{ref2} = \sum_i RM_i \times N_i$$

where RMi is a semi-static rate matching attribute for transport channel i, Ni is the number of bits output from a radio frame segmentation block for transport channel i and the sum is taken over all transport channels i in TFCref2;

$$K_k = \sum_i RM_i \times N_i$$

where the sum is taken over all transport channels i in the TFCk;

$$L_{ref2} = \sum_i \frac{1}{SF_i}$$

where SFi is a spreading factor of a dedicated physical channel (DPCH) i and the sum is taken over all DPCH i used in TFCref2; and $$L_k = \sum_i \frac{1}{SF_i}$$

where the sum is taken over all DPCH i used in TFCk.

15. A wireless transmit receive unit (WTRU) comprising: a transmitter configured to transmit communication signals in a forward composite channel carrying data in a selected combination of channels with respect to a selected physical transmission configuration of the forward composite channel;

a processor configured to make forward channel power adjustments as a function of target metrics computed based on the data signals as received over the forward channel in conjunction with applying a gain factor based on a reference combination of channels with respect to the selected physical transmission configuration of the forward composite channel;

said transmitter configured to reconfigure the transmission of communication signals in the forward composite channel from transmission in a first selected combination of channels with respect to a first physical transmission configuration of the forward composite channel to transmission in a second selected combination of channels with respect to a second physical transmission configuration of the forward composite channel;

said processor configured to compute and apply a gain factor β to the transmission of communication signals in the first selected combination of channels with respect to the first physical transmission configuration of the forward composite channel such that the gain factor β is determined based on spreading factors of the first selected combination and a reference combination of channels with respect to the first physical transmission configuration of the forward composite channel; and said processor configured to compute and apply a gain factor β' to the transmission of communication signals in the second selected combination of channels with respect to the second physical transmission configuration of the forward composite channel where the gain factor β' is determined based on spreading factors of the second selected combination and a reference combination of channels with respect to the second physical transmission configuration of the forward composite channel.

16. The WTRU of claim 15 configured for use in a code division multiple access (CDMA) system where the data channels are transport channels (TrCHs) that may have different spreading factors for different physical configurations of the composite channel, the composite channel is an uplink coded composite transport channel (CCTrCH) and a transport format combination (TFC) is associated with each of a set of predefined format channel combinations of the CCTrCH defined for all physical configurations, wherein the processor is configured to select a reference combination of channels, TFCref1, with respect to the first physical transmission configuration of the forward composite channel from the set of predefined format channel combinations, that has an associated gain factor βref1 and a reference combination of channels, TFCref2, with respect to the second physical transmission configuration of the forward composite channel from the set of predefined format channel combinations that has an associated gain factor βref2.

17. The WTRU of claim 16 wherein the processor is configured to identify a common TFC that yields similar puncturing/repetition for the first and second physical channel configurations and to select the common TFC as the reference channel combination TFCref1 and also the reference channel combination TFCref2 and to select the gain factor βref2 to equal the gain factor βref1.

18. The WTRU of claim 16 wherein the processor is configured to select the reference channel combination TFCref2 by identifying a TFC that has similar puncturing/repetition for the second physical channel configuration as compared with puncturing/repetition of reference channel combination TFCref1 with respect to the first physical channel configuration and to select the gain factor βref2 to equal the gain factor βref1.

19. The WTRU of claim 16 wherein the processor is configured to select the reference channel combination TFCref2 to be the same TFC as the reference channel combination TFCref1 and to compute the gain factor βref2 based on the gain factor βref1 and spreading factor changes in the reference channel combination from the first physical configuration to the second physical configuration of the forward composite channel.

20. The WTRU of claim 19 wherein the processor is configured to compute the gain factor βref2 such that $$\beta_{ref2} = \sqrt{\frac{L_{ref1}}{L_{ref2}}} \times \beta_{ref1}$$

where $$L_{ref1} = \sum_i \frac{1}{SF_i}$$

where SFi is a spreading factor of a dedicated physical channel (DPCH) i with respect to the first physical configuration and the sum is taken over all DPCH i used in TFCref1; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref2.

21. The WTRU of claim 16 wherein the processor is configured to select the reference channel combination TFCref2 to be the a different TFC from the reference channel combination TFCref1 and to compute the gain factor βref2 such that $$\beta_{ref2} = \sqrt{\frac{L_{ref1}}{L_{ref2}}} \times \sqrt{\frac{K_{ref2}}{K_{ref1}}} \times \beta_{ref1}$$

where:

$$K_{ref1} \sum_i RM_i \times N_i$$

where RMi is a semi-static rate matching attribute for transport channel i, Ni is the number of bits output from a radio frame segmentation block for transport channel i and the sum is taken over all transport channels i in TFCref1 with respect to the first physical configuration;

$$K_{ref2} \sum_i RM_i \times N_i$$

where RMi is a semi-static rate matching attribute for transport channel i, Ni is the number of bits output from a radio frame segmentation block for transport channel i and the sum is taken over all transport channels i in TFCref2 with respect to the second physical configuration;

$$L_{ref1} = \sum_i \frac{1}{SF_i}$$

where SFi is a spreading factor of a dedicated physical channel (DPCH) i with respect to the first physical configuration and the sum is taken over all DPCH i used in TFCref1; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref2.

22. The WTRU of claim 16 where one of the format channel combinations is a selected reference combination of channel, TFCref, and a jth combination of channels TFCj is the selected channel combination for data transmission on the forward composite channel wherein the processor is configured to apply and compute a gain factor βj for the selected combination of channels TFCj such that: $\beta_j = X \times \beta_{ref}$.

23. A method of transmission power control for a wireless transmit receive unit (WTRU) that transmits communication signals in a forward composite channel carrying data in a selected combination of channels with respect to a selected physical transmission configuration of the forward composite channel where the WTRU is configured to make forward channel power adjustments as a function of target metrics computed based on the data signals as received over the forward channel in conjunction with applying a gain factor based on a reference combination of channels with respect to the selected physical transmission configuration of the forward composite channel, the method comprising:

determining a reference combination of channels with respect to the forward composite channel;

transmitting communication signals in the forward composite channel in a selected combination of channels with respect to a first physical transmission configuration of the forward composite channel;

using the reference combination of channels of the forward composite channel for determining a gain factor β to apply to the transmission of communication signals in the selected combination of channels with respect to the first physical transmission configuration of the forward composite channel;

making forward channel power adjustments as a function of target metrics computed based on the data signals as received over the forward channel with respect to the first physical transmission configuration of the forward composite channel;

reconfiguring the transmission of communication signals in the forward composite channel to transmit the signals in a selected combination of channels with respect to a second physical transmission configuration of the forward composite channel in conjunction with adjusting the forward channel transmission power based on an updated target metric computed as a function of spreading factor changes in the reference channel combination from the first physical configuration to the second physical configuration of the forward composite channel; and using the reference combination of channels with respect to the second physical transmission configuration of the forward composite channel for determining a gain factor $\beta'$ to apply to the transmission of communication signals in the selected combination of channels with respect to the second physical transmission configuration of the forward composite channel.

24. The method of claim 23 where the WTRU is configured for use in a code division multiple access (CDMA) system, the data channels are transport channels (TrCHs) that may have different spreading factors for different physical configurations of the composite channel, the composite channel is an uplink coded composite transport channel (CCTrCH), a transport format combination (TFC) is associated with each of a set of predefined format channel combinations of the CCTrCH defined for all physical configurations and Signal to Interference Ratio (SIR) metrics of the transmitted communication signals as received are used to compute a target SIR upon which forward channel power adjustments are based, the method wherein the reference combination of channels of the forward composite channel is determined to be one of the set of predefined format channel combinations, TFCref, that has an associated gain factor $\beta$ref and the updated target metric used in adjusting the forward channel transmission power in conjunction with reconfiguration is an updated target SIR.

25. The method of claim 24 wherein the updated target SIR, SIR_target$_{new}$, is computed such that $$\text{SIR\_target}_{new} = \text{SIR\_target}_{old} + 10\log\left(\frac{L_{ref2}}{L_{ref1}}\right)$$

where

SIR_target$_{old}$ is the most recently used target metric for making forward channel power adjustments with respect to the first physical transmission configuration of the forward composite channel;

$$L_{ref1} = \sum_i \frac{1}{SF_i}$$

where SFi is a spreading factor of a dedicated physical channel (DPCH) i with respect to the first physical configuration and the sum is taken over all DPCH i used in TFCref; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref.

26. The method of claim 24 wherein:

a jth combination of channels TFCj is selected for data transmission with respect to the first physical transmission configuration on the forward composite channel and a gain factor $\beta$j is applied that is computed for the selected combination of channels such that: $\beta$j=X*$\beta$ref where X is based upon spreading factors of TFCj and TFCref with respect to the first physical transmission configuration of the forward composite channel; and a kth combination of channels TFCk is selected for data transmission with respect to the second physical transmission configuration on the forward composite channel and a gain factor $\beta$k is applied that is computed for the selected combination of channels such that: $\beta$k=X'*$\beta$ref where X' is based upon spreading factors of TFCk and TFCref with respect to the second physical transmission configuration of the forward composite channel.

27. The method of claim 26 wherein the gain factor $\beta$j is computed such that $$\beta_j = \sqrt{\frac{L_{ref1}}{L_j}} \times \sqrt{\frac{K_j}{K_{ref1}}} \times \beta_{ref}$$

where:

$$K_{ref1} = \sum_i RM_i \times N_i$$

where RMi is a semi-static rate matching attribute for transport channel i, Ni is the number of bits output from a radio frame segmentation block for transport channel i and the sum is taken over all transport channels i in TFCref;

$$K_j = \sum_j RM_i \times N_i$$

where the sum is taken over all transport channels i in the TFCj;

$$L_{ref1} = \sum_i \frac{1}{SF_i}$$

where SFi is a spreading factor of a dedicated physical channel (DPCH) i and the sum is taken over all DPCH i used in TFCref with respect to said first physical configuration; and $$L_j = \sum_i \frac{1}{SF_i}$$

where the sum is taken over all DPCH i used in TFCj with respect to said first physical configuration; and
the gain factor $\beta_k$ is computed such that $$\beta_k = \sqrt{\frac{L_{ref2}}{L_k}} \times \sqrt{\frac{K_k}{K_{ref2}}} \times \beta_{ref}$$

where:

$$K_{ref2} = \sum_i RM_i \times N_i$$

where $RM_i$ is a semi-static rate matching attribute for transport channel i, $N_i$ is the number of bits output from a radio frame segmentation block for transport channel i and the sum is taken over all transport channels i in TFCref;

$$K_k = \sum_i RM_i \times N_i$$

where the sum is taken over all transport channels i in the TFCk;

$$L_{ref2} = \sum_i \frac{1}{SF_i}$$

where $SF_i$ is a spreading factor of a dedicated physical channel (DPCH) i and the sum is taken over all DPCH i used in TFCref with respect to said second physical configuration; and $$L_k = \sum_i \frac{1}{SF_i}$$

where the sum is taken over all DPCH i used in TFCk with respect to said second physical configuration.

28. A wireless transmit receive unit (WTRU) comprising:
a transmitter configured to transmit communication signals in a forward composite channel carrying data in a selected combination of channels with respect to a selected physical transmission configuration of the forward composite channel;
a processor configured to make forward channel power adjustments as a function of target metrics computed based on the communication signals as received over the forward channel in conjunction with applying a gain factor based on a reference combination of channels with respect to the selected physical transmission configuration of the forward composite channel; and
said transmitter configured to reconfigure the transmission of communication signals in the forward composite channel from transmission in a first selected combination of channels with respect to a first physical transmission configuration of the forward composite channel to transmission in a second selected combination of channels with respect to a second physical transmission configuration of the forward composite channel in conjunction with the processor adjusting the forward channel transmission power based on an updated target metric computed as a function of spreading factor changes in the reference channel combination from the first physical configuration to the second physical configuration of the forward composite channel.

29. The WTRU of claim 28 wherein the processor is further configured to use the reference combination of channels of the forward composite channel for determining a gain factor $\beta$ to apply to the transmission of communication signals in selected combination of channels of the forward composite channel.

30. The WTRU of claim 29 configured for use in a code division multiple access (CDMA) system where the data channels are transport channels (TrCHs) that may have different spreading factors for different physical configurations of the composite channel, the composite channel is an uplink coded composite transport channel (CCTrCH), a transport format combination (TFC) is associated with each of a set of predefined format channel combinations of the CCTrCH defined for all physical configurations, the reference combination of channels of the forward composite channel, TFCref, is one of the set of predefined format channel combinations and has an associated gain factor $\beta_{ref}$ and where Signal to Interference Ratio (SIR) metrics of the transmitted communication signals as received are used to compute a target SIR upon which forward channel power adjustments are based, the WTRU wherein the processor is configured to use an updated target SIR as the updated target metric used in adjusting the forward channel transmission power in conjunction with transmission reconfiguration.

31. The WTRU of claim 30 wherein the processor is configured to compute the updated target SIR, SIR_target$_{new}$, such that $$\text{SIR\_target}_{new} = \text{SIR\_target}_{old} + 10 \log\left(\frac{L_{ref2}}{L_{ref1}}\right)$$

where
SIR_target$_{old}$ is the most recently used target metric for making forward channel power adjustments with respect to the first physical transmission configuration of the forward composite channel;

$$L_{ref1} = \sum_i \frac{1}{SF_i}$$

where $SF_i$ is a spreading factor of a dedicated physical channel (DPCH) i with respect to the first physical configuration and the sum is taken over all DPCH i used in TFCref; and $$L_{ref2} = \sum_i \frac{1}{SF_i}$$

where SFi is a spreading factor of a dedicated physical channel (DPCH) i with respect to the second physical configuration and the sum is taken over all DPCH i used in TFCref.

32. The WTRU of claim 30 wherein the processor is configured such that, when a jth combination of channels TFCj is selected for data transmission with respect to a current physical transmission configuration on the forward composite channel, a gain factor βj is computed and applied for the selected combination of channels such that: βj=X*βref where X is based upon spreading factors of TFCj and TFCref with respect to the current physical transmission configuration of the forward composite channel.

33. A wireless transmit receive unit (WTRU) configured for use in a code division multiple access (CDMA) system in which data is communicated via transport channels (TrCHs) of a coded composite transport channel (CCTrCH) in a selected transport format combination (TFC) associated with a set of predefined format channel combinations where a gain factor β is applied for transmitter power control for a combination of channels that is selected for data transmission, the WTRU comprising:

a processor configured to compute a gain factor βj for a j-th TFC which is not the same as a reference TFC such that $$\beta_j = \beta_{ref} \cdot \sqrt{\frac{L_{ref}}{L_j}} \cdot \sqrt{\frac{K_j}{K_{ref}}}$$

where:

βref is a gain factor for the reference TFC;

$$K_{ref} = \sum_i RM_i \cdot N_i$$

where RMi is a semi-static rate matching attribute for transport channel i, Ni is the number of bits output from a radio frame segmentation block for transport channel i and the sum is taken over all transport channels i in the reference TFC;

$$K_j = \sum_i RM_i \cdot N_i$$

where the sum is taken over all transport channels i in the j-th TFC;

$$L_{ref} = \sum_i \frac{1}{SF_i}$$

where $SF_i$ is a spreading factor of a type of physical channel i and the sum is taken over all such physical channels i used in the reference TFC; and $$L_j = \sum_i \frac{1}{SF_i}$$

where the sum is taken over all such physical channels i used in the j-th TFC.

34. The WTRU according to claim 33 wherein the processor is configured to compute the gain factor βj for the j-th TFC where the type of physical channel i is a dedicated physical channel (DPCH).

35. A method for a wireless transmit receive unit (WTRU) configured for use in a code division multiple access (CDMA) system in which data is communicated via transport channels (TrCHs) of a coded composite transport channel (CCTrCH) in a selected transport format combination (TFC) associated with a set of predefined format channel combinations where a gain factor β is applied for transmitter power control for a combination of channels that is selected for data transmission, the method comprising:

computing a gain factor βj for a j-th TFC which is not the same as a reference TFC such that $$\beta_j = \beta_{ref} \cdot \sqrt{\frac{L_{ref}}{L_j}} \cdot \sqrt{\frac{K_j}{K_{ref}}}$$

where:

βref is a gain factor for the reference TFC;

$$K_{ref} = \sum_i RM_i \cdot N_i$$

where $RM_i$ is a semi-static rate matching attribute for transport channel i, $N_i$ is the number of bits output from a radio frame segmentation block for transport channel i and the sum is taken over all transport channels i in the reference TFC;

$$K_j = \sum_i RM_i \cdot N_i$$

where the sum is taken over all transport channels i in the j-th TFC;

$$L_{ref} = \sum_i \frac{1}{SF_i}$$

where $SF_i$ is a spreading factor of a type of physical channel i and the sum is taken over all such physical channels i used in the reference TFC; and $$L_j = \sum_i \frac{1}{SF_i}$$

where the sum is taken over all such physical channels i used in the j-th TFC.

36. The method according to claim 35 wherein the gain factor βj is computed for the j-th TFC where the type of physical channel i is a dedicated physical channel (DPCH).

* * * * *

UNITED STATES PATENT AND TRADEMARK OFFICE
CERTIFICATE OF CORRECTION

PATENT NO.       : 7,373,164 B2
APPLICATION NO.  : 10/948714
DATED            : May 13, 2008
INVENTOR(S)      : Iacono et al.

It is certified that error appears in the above-identified patent and that said Letters Patent is hereby corrected as shown below:

At column 3, line 18, after the words "an open", delete "ioop", and insert --loop--.

At column 3, line 56, after the word "such", insert --as--.

At column 4, line 18, before the words "the example", delete "is", and insert --in--.

At column 6, line 66, after the word "factor", delete "β", and insert --βj--.

At column 7, line 44, before the word "gain", insert --of--.

At column 7, line 49, before the words "a gain", delete "computed", and insert --compute--.

At column 8, line 66, after the words "one of", insert --a--.

At column 9, line 4, after the words "one of", insert --a--.

At column 9, line 29, after the word "factor", delete "β", and insert --βj--.

At column 11, line 45, after the words "target SIR,", delete "SIR_targetnew," and insert --SIR_target$_{new}$--.

At column 16, line 24, after "WTRU", insert --10--.

At column 16, line 33, after the word "preferably", delete "be configured to calculates", insert --configured to calculate--.

At column 20, line 34, after the word "example", delete "is".

At column 20, line 51, after the word "composed", delete "by" and insert --of--.

At column 24, line 50, before the words "the gain", delete "calculate" and insert --calculates--.

Signed and Sealed this
Seventh Day of August, 2012

David J. Kappos
*Director of the United States Patent and Trademark Office*

CERTIFICATE OF CORRECTION (continued)
U.S. Pat. No. 7,373,164 B2

At column 26, line 2, after the word "preferably", insert --sends--.

At claim 13, column 33, line 58, after the words "to be", delete "the".

At claim 21, column 37, line 48, after the words "to be", delete "the".

At claim 27, column 40, delete lines 52 & 53, and insert -- $K_j = \sum_i RM_i x N_i$ --.